FIG. 1.

INVENTOR.
CLYDE H. O. BERG,
BY
AGENT.

FIG. 2.

May 20, 1958 C. H. O. BERG 2,835,629
CONTACTING PROCESS AND APPARATUS
Filed April 21, 1952 4 Sheets-Sheet 3

INVENTOR.
CLYDE H. O. BERG,
BY
AGENT.

May 20, 1958  C. H. O. BERG  2,835,629
CONTACTING PROCESS AND APPARATUS
Filed April 21, 1952  4 Sheets-Sheet 4

FIG. 5.

INVENTOR.
CLYDE H. O. BERG,
BY

AGENT.

United States Patent Office 2,835,629
Patented May 20, 1958

2,835,629

CONTACTING PROCESS AND APPARATUS

Clyde H. O. Berg, Long Beach, Calif., assignor to Union Oil Company of California, Los Angeles, Calif., a corporation of California Application April 21, 1952, Serial No. 283,464

20 Claims. (Cl. 196—28)

This invention relates to improved processes and apparatus for effecting the continuous contacting of solids with fluids and in particular relates to a process and apparatus wherein at least two fluids contact the solids in separate steps such as takes place in catalytic reactions in which the solid catalyst is used to contact fluids to be reacted and then the catalyst is contacted with regeneration fluids for reheating and regeneration.

Such solids-fluid contacting processes have heretofore been carried out extensively in fixed bed reactors in which a plurality of separate vessels containing the solid catalyst was employed and in which the reactor alternately was fed with the fluids to be reacted and subsequently fed with a regeneration gas such as flue gas containing oxygen. The well-known hydro-forming process is an example of such a fixed bed operation and its complexities from process and apparatus standpoints are well established.

Solids-fluid contacting processes have been carried out employing moving beds of solids as for example in the TCC process for catalytic cracking of hydrocarbons. In this process the catalyst is conveyed by bucket elevators to the top of a tall structure and passed downwardly by gravity through sealing legs and reaction or regeneration vessels. The process is limited in its operating pressure to about 15 p. s. i. g. (pounds per square inch gauge). The bucket elevators are limited to about 150 tons per hour of catalyst as a maximum rate. The moving mechanical parts associated therewith require periodic maintenance. Sealing legs of the order of 75 feet in height are required to prevent intermixing of the hydrocarbon vapors with oxygen in the regenerator, accounting for the extensive height of the structure.

In all of the foregoing processes the granular solids prior to reheating or regeneration must be stripped free of the fluids being treated. Because of the adsorptive nature of most catalysts, this stripping operation is difficult at the elevated pressures at which many of the well-known contacting operations are desirably effected. Difficulty in catalysts or solids stripping has many adverse effects including a reduction in volumetric yield. The present invention, therefore, is directed to a continuous moving bed solids-fluid contacting process and apparatus which is free of moving parts used in catalyst conveyance and free of an extraneous conveyance medium, will operate efficiently at elevated reaction pressures, does not require extensive sealing zones and effectively permits high pressure operation and low pressure stripping regeneration.

It is a primary object of this invention to provide a process involving the two-step fluid-solids contact in which one step is effected while the granular solids are being conveyed by the contacting fluids upwardly through a contacting-conveyance zone and during which conveyance the granular solids are maintained in compact unfluidized form and at the same bulk density as the apparent or bulk density of the solids when at rest and unaerated or of a downwardly moving compact bed of such granular solids.

It is an additional object of this invention to provide in a two-step solids-fluid contacting process, an improved upflow contacting operation in which the reactant fluids pass from a relatively high pressure through a contacting-conveyance zone to a relatively low pressure at the outlet thereof permitting the high pressure contacting of the granular solids with the fluid to be treated and delivering the spent solids at the outlet of the reaction-conveyance zone at a low pressure amenable to efficient spent solids stripping and easily controlled reheating and/or regeneration.

A further object is to provide a solids-fluid contacting process in which the well-known advantages of high solid catalyst to oil ratios can be realized in industrial scale catalytic conversions of such fluids as hydrocarbons.

Still another object is to provide a moving solids-fluid contacting process in which the loss of solids due to attrition and abrasion and equipment erosion has been virtually eliminated.

Another object of this invention is to provide in another modification an upflow solids reheating and regeneration operation in the two-step contacting process referred to in which substantially compact unfluidized spent granular solids are conveyed by and simultaneously regenerated with a concurrent flow of a regenerating fluid depressuring through an elongated regeneration zone.

An additional object is to provide an improved apparatus for effecting the afore-mentioned objects.

Other objects and advantages of this invention will become apparent to those skilled in the art as the description thereof proceeds.

Briefly, this invention comprises an improved process and apparatus for the contacting of moving granular solids with fluids and wherein the granular solids are circulated through at least two separate contacting zones as in the well-known solid catalyzed hydrocarbon reactions wherein the catalyst is contacted with a hydrocarbon in a contacting zone and the spent catalyst resulting is subsequently regenerated and reheated in a regeneration and reheating zone. The principal characteristic of this invention lies in the fact that in one of the contacting zones referred to the granular solids are conveyed upwardly through the contacting zone as a substantially compact porous continuous unfluidized granular mass by means of the flow of the contacting fluid therethrough while at least part of the solids then flow generally downward through another contacting zone for return to the entrance to the first contacting zone. The apparent or bulk density of the granular solids during passage through the upflow contacting zone is maintained at a value substantially equal to the static bulk or apparent density and in unfluidized form. Thus, in this two-step contacting process, one of the steps is effected simultaneously with the conveyance of the granular contact material in compact unfluidized form upwardly through one contacting zone after being removed from the outlet of the preceding contacting zone.

For example, in the application of this invention to hydrocarbon conversion processes, now widely known in the petroleum industry and in which hydrocarbons to be treated are passed in direct contact with granular solid contact material, the contact material is contacted with hydrocarbon vapor and/or liquid and passed upwardly through an elongated conveyance-contacting zone in which the granular solids are maintained in compact unfluidized form. The hydrocarbon feed to be converted is depressured therethrough generating the conveyance force required to lift the granular solids and at the same time contacting the solid contact material forming spent solids and hydrocarbon products. This conveyance-reaction step is characterized by a relatively high pressure drop associated with the flow of hydrocarbon, this pressure differential being of the order of between about 0.1 and 1.5 p. s. i. g. per foot of conveyance-contacting zone vertical rise and varies with the physical properties of the solid contact material and the concurrently flowing fluid. This unique contacting step permits an initial high pressure contact of the hydrocarbon with the solid material and yet allows the outlet of the contacting zone to be maintained at a relatively low pressure, such as atmospheric or subatmospheric, and from which the spent solids pass through a relatively low pressure solids stripping zone. Under these pressure conditions, extremely effective hydrocarbon stripping from the solids is effected at a low pressure relative to the average upflow contacting zone pressure, thus markedly raising the volumetric yields of the product obtained in the process. Following the stripping step the contact material passes downwardly either as a moving bed or as a fluidized mass into a regeneration zone in which the hydrocarbonaceous deposits are burned from the contact material. The regenerated granular solids then are pressured into the inlet of the contacting zone and depressured therethrough with hydrocarbon feed stock.

In addition, heretofore industrially unobtainable catalyst to oil ratios of the order of 100 pounds of catalyst per pound of oil or more are obtainable, if desired, on a commercial operation scale, and these ratios may be reduced to as low as 0.1 or below if desired without loss of the advantages in stripping, reheating and regeneration referred to above.

The unique advantages obtainable when the process is applied to hydrocarbon conversion reactions are also obtainable when the upflow contacting principles are applied to other reactions in which fluids are contacted with granular solid contact material. For example, the principles of this invention are applicable to the thermal cracking and/or coking of hydrocarbon vapors and/or liquid in the presence of heated granules of alumina, coke, metals, and the like. The process is also applicable to the catalytic cracking of gas oil in the presence of silica-alumina synthetic bead catalyst, acid-treated natural clay catalyst, as well as to the catalytic reforming of naphthas and low-grade gasolines in the presence of such catalysts as molybdenum trioxide, cobalt molybdate, cobalt oxide-molybdenum trioxide catalyst, chromium oxide, and the like. This invention is also applicable in the catalytic desulfurization and denitrogenation of hydrocarbons contaminated with sulfur and nitrogen wherein the catalyst consists of cobalt molybdate, a mixture of cobalt oxide and molybdenum trioxide, etc. As further examples, the invention may be applied to the catalytic polymerization of unsaturated hydrocarbon gases such as propylene and butylenes in the presence of well-known solid polymerization catalysts such as solid phosphoric acid as well as to the catalytic isomerization of normal paraffin hydrocarbons into isoparaffin hydrocarbons in the presence of hydrogen halide vapors and the solid aluminum halide catalyst such as the chloride or bromide. The application of these principles to other specific operations may readily occur to those skilled in the art of solids-fluid contacting processes subsequent to this disclosure.

The advantages which are obtained in the application of the upflow compact solids-fluid contacting process according to this invention include the establishment and maintenance of a high inlet pressure and a low outlet pressure in the conveyance-contacting zone, increased ease in stripping fluids from the spent solids, increased volumetric recoveries or yields of product, the elimination of a reaction vessel separate from the conveyance system, the elimination of complex conveyers and the complicated valving and timing operations employed in the fixed bed multiple reactor systems, and the attainment of high solids to fluid weight ratios especially desirable in the catalytic hydrocarbon conversion process of the petroleum industry. Special advantages have been found to result from the relatively large pressure differential in the conveyance-contacting zone and from the contacting of upwardly flowing compact unfluidized solids which permit a substantially complete elimination of loss of solids due to attrition or abrasion, a 5 to 10 fold increase in solids circulation rates, and further permits the industrial use of the high solids to fluid ratios when desirable and yet permit an efficient operation at very low solids to fluid ratios with excellent fluids-solids contact resulting regardless of the solids to fluids ratio.

These advantages do not accrue in processes employing a suspension, dispersion, or otherwise fluidizing the other granular materials in the upwardly flowing fluids. This is due to the fact that such suspensions, having all the characteristics of the conventional pneumatic conveyer, have characteristically a very low pressure drop, being of the order of 1 p. s. i. g. per 100 feet of length and thus the outlet of the reaction conveyance zone is under such operating conditions at a pressure substantially the same as the inlet. Such fluidized suspensions of solids are also characterized by relatively high solids loss due to attrition, equipment erosion and a very inefficient solids-fluid contact when attempting to employ low catalyst to fluid ratios since the suspension becomes very dilute. The maximum solids to fluid ratio is limited to values far below those attainable in this invention due to the fact that the solids are dispersed in the fluid as a suspension.

In the present invention in which compact unfluidized solids flow upwardly through a contacting zone under the influence of a depressuring flow of fluid, the prevention of fluidization and the maintenance of the compact unfluidized state of the solids is carried out by applying to the granular solids discharging therefrom a thrust force which has a tendency to restrict the discharge of solids from the outlet of the conveyance-contacting zone without effecting any substantial restriction on the discharge of fluids therefrom. This thrust force is generated by the moving solids themselves in flowing from the conveyance zone while maintaining a transverse plate or grid adjacent the outlet or submerging the outlet in a mass of granular solids through which the fluid flow rate is insufficient to counteract the downward force of gravity or by discharging the solids downwardly onto the top of a bed of granular solids whereby the cone of solids formed following discharge therefrom has an apex within the conveyance zone adjacent its outlet.

The movement of compact unfluidized solids through such an elongated conveyance-contacting zone depends upon the generation of a pressure differential or gradient between the bottom and the top of each individual solid granule in the porous mass of compact unfluidized solids whereby a resultant force acting in a direction different from the direction of gravity exceeds the gravitational force acting in the opposite direction. The pressure gradient is generated by causing a fluid to flow through the tortuous path comprising the interconnected interstices existing between adjacent individual granules of the porous compact mass. The flow of fluid referred to is controlled to establish and maintain a pressure gradient which exceeds the minimum gradient at which the gravitational forces are neutralized.

The ratio of the force acting in the direction in which the solids are to be conveyed to the gravitational force acting in the opposite direction has been defined as the conveyance force ratio and is given by:

$$\frac{\left(\frac{dp}{dl}\right)}{\rho_s \cos \theta}$$

(wherein $dp/dl$ is the pressure gradient in pounds per square foot per foot within the conveyance-contacting zone, $\rho_s$ is the apparent or bulk density of the compact unfluidized granular solids in pounds per cubic foot and $\theta$ is the angle of inclination of the conveyance-contacting zone struck downwardly from a vertical reference axis;

other consistent units may be used). When the conveyance force exceeds the gravitational force and the slight frictional forces, the conveyance force ratio is greater than 1.0 and under such conditions the granular solids will move.

The minimum pressure gradient referred to above as necessary to establish and maintain compact unfluidized solids flow is:

$$dp/dl = \rho_s \cos \theta$$

and the fluid flow rate in the upflow contacting zone is controlled to generate a pressure gradient which exceeds this value. At values slightly above this minimum, the maximum weight ratios of solids to fluid are realized in the upflow contacting zone, lower ratios are obtained by increasing the fluid flow rate which results in pressure gradients in excess of the minimum value.

Application of the thrust force referred to maintains the solids in compact unfluidized form in spite of the concurrent flow of contacting fluid. The conveyance force ratio must exceed 1.0 but has no upper limit above which the process is not operable. Conveyance force ratios of as high as 50 or 100 or more may be employed under which conditions larger quantities of fluid than the minimum quantity to establish a conveyance force ratio exceeding 1.0 flow through the system and the conveyance force exceeds by many times the minimum force which is necessary for solids movement. A great variation in the solids-fluid weight ratio in the reaction or contacting zone below the maximum obtained at the minimum conveyance force ratio is realized.

The solids flow rate is thus independent of the fluid flow once a conveyance force ratio of 1.0 is exceeded. The solids flow rate and residence time are varied in this process by controlling the rate at which solids are removed from the solids-fluid separator zone adjacent the outlet of the upflow conveyance-contacting zone. In this way the solids residence time therein is variable within extremely wide limits. The fluid flow rate is varied by raising the inlet pressure or decreasing the outlet pressure.

The fluid residence time may be varied by changing the length of the conveyance-contacting zone or by changing the velocity (increasing the pressure gradient) of the fluid within the contacting zone while maintaining the velocity therein above the minimum necessary to establish and maintain a conveyance force ratio greater than 1.0.

The solids to fluid ratio is also strongly effected by the solids particle size. With particles averaging 4–8 mesh, maximum solids to fluid ratios are of the order of 105. With particles which are smaller, the maximum ratios are considerably higher and will exceed 200. With larger particles, the maximum ratios can be reduced to 10 or lower. Accordingly, a wide variation in the maximum solids to fluid weight ratio is obtained by variation in the average size of the solid particles employed. For a contacting zone of a given height and a given fluid, the minimum pressure differential remains almost constant and solids size variation permits the great variation in solids to fluid ratio at substantially constant pressure drop.

It will thus be apparent that the combination process of this invention is characterized by its extreme flexibility with regard to solids and fluid flow rate, residence time, solids to fluid weight ratio, by the absence of moving mechanical parts and amenability to high pressure reaction conditions simultaneously with low pressure conditions existing at the contacting-conveyance zone outlet permitting low pressure reheating and regeneration and extremely efficient fluid stripping from the solids.

The process principles of this invention and the various forms of apparatus in which they may be applied will be more readily understood from the accompanying drawings in which.

Figure 1:
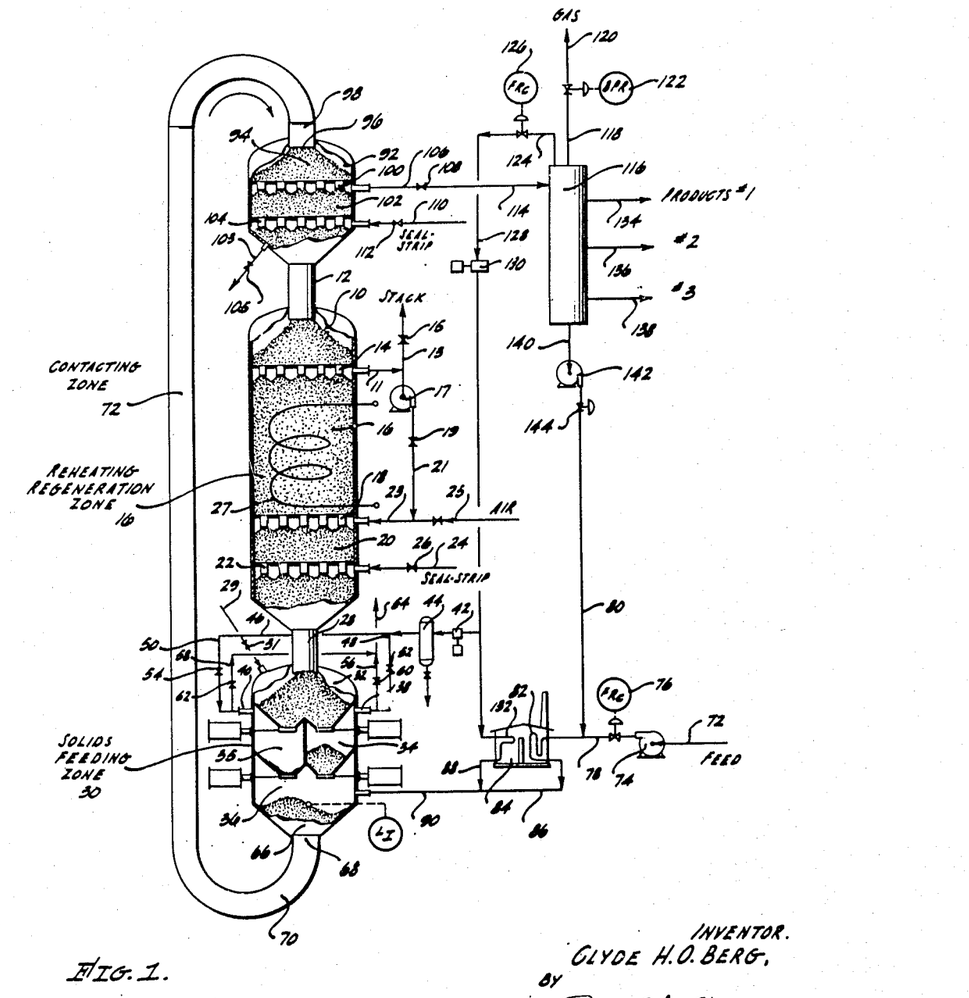
Figure 1 is an elevation view in cross section of one modification of the upflow solids fluid contacting system of this invention and a simplified flow sheet of the process in which it is used in which moving beds of solids are employed throughout.

Referring now more particularly to Figure 1, the apparatus is provided with a regeneration vessel 10 into which granular contact material flows by gravity as a compact unfluidized bed through inlet conduit 12. The solids pass by gravity downwardly successively through regeneration gas disengaging zone 14, regeneration zone 16, regeneration gas engaging zone 18, stripping and sealing zone 20, and stripping and sealing gas engaging zone 22. The granular solids during passage through zone 16 are directly contacted with a regeneration fluid which, in hydrocarbon conversion operations usually comprises a gas containing oxygen serving to burn off the hydrocarbonaceous deposits laid down upon each individual solid particle during the hydrocarbon conversion reaction. When the granular solids are catalysts the catalyst is herein regenerated. When the granular solids comprise other granular contact material such as aluminum oxide pebbles, coke granules, metal balls, and the like, the regeneration zone may or may not provide facilities for burning hydrocarbonaceous materials from the solids or it usually is provided for reheating the contact material in which case the regeneration gas comprises combustion gases.

The granular solids in reheating-regeneration zone 16 are contacted with a gas containing oxygen to reheat and/or regenerate the solids by burning a hydrocarbonaceous deposit therefrom. The flue gases resulting are removed from disengaging zone 14 through line 11, part of which are disposed of through line 13 controlled by valve 15. To facilitate temperature control the remaining portion of this gas is pumped by means of blower 17 at a rate controlled by valve 19 through lines 21 and 23 together with fresh air and fuel gas if necessary, introduced through line 25, into regeneration gas engaging zone 18 for countercurrent passage therethrough. If required, means 27 may be provided to dissipate heat liberated during regeneration of such solids as granular catalysts. Also the regeneration gas flow may be made concurrent if desired.

In zone 20 the granular solids following regeneration are stripped with a stripping gas such as steam to remove traces of the regeneration gas and to prevent mixing of the regeneration gases with the fluids which subsequently contact the solids. A stripping and sealing gas is introduced into engaging zone 22 through line 24 controlled by valve 26. Part of this gas moves upwardly through zone 20 to strip regeneration gases from the solids while the remaining part passes downwardly with the granular solids through outlet 28 from regeneration vessel 10.

The regenerated or reheated granular solids are discharged through conduit 28 into solids feeding vessel 30. Make-up solids as required may be introduced through line 29 controlled by valve 31. This vessel is provided with upper surge zone 32, a plurality of intermediate pressuring zones 34 and 35 and a lower surge or induction zone 36. The upper surge zone 32 has a lower outlet opening for solids communicating with each of the plurality of pressuring zones. These outlets are provided with pneumatic or electrically operated automatic valves. Each of the plurality of intermediate pressuring zones 34 and 35 is also provided with a lower outlet opening for solids also having at each of said openings a similar automatic valve. Thus, as granular solids continuously discharge into upper surge zone 32 they are subsequently discharged into the intermediate pressuring zone one at a time so that when one such pressuring zone is filled with solids it is subsequently pressured, by the introduction of high pressure fluids, from the pressure of the upper surge zone 32 to the pressure of the lower surge or induction zone 36 while the solids valves associated with that particular pressuring zone are closed. The lower valve is then opened and the solids are discharged by gravity into the induction zone 36. While this is occurring the other induction zone is depressuring, filling and pressuring.

Conduits 38 and 40 opening into the intermediate pressuring zones 34 and 35 are provided with manifolded and valved conduits for introducing the high pressure fluids when an individual intermediate pressuring zone is being pressured and for the removal of fluids therefrom prior to filling the intermediate pressuring zone. An equalizing valve, not shown, may be provided to partly pressure one pressuring zone when depressuring another. Supply of pressuring fluid is provided by means of compressor 42 which maintains surge drum 44 at a sufficiently high pressure to satisfy the demands of the solids feeding zone 30. High pressure manifold 46 communicates through lines 48 and 50 controlled by automatic valves 52 and 54 with intermediate pressuring zones 34 and 35 respectively. Openings 38 and 40 associated with these same intermediate pressuring zones communicate through lines 56 and 58 controlled by automatic valves 60 and 62 with vent gas manifold 64. In those cases when an inert gas or fluid is employed for pressuring the intermediate pressuring zones 34 and 35, all or a portion of the vented gas may be recycled from line 64 to compressor 42. The automatic solids valves at the inlets and outlets of the intermediate pressuring zones and in the pressuring and depressuring lines are all synchronized in operation and actuated by a cycle timer not shown but analogous to the one discussed in connection with the apparatus of Figure 2.

Pressuring zones 34 and 35 may also and simultaneously be employed as a solids pretreating system disposed ahead of the contacting step. For example, in processes such as catalytic reforming and desulfurization the catalyst following regeneration is brought to its highest activity by means of a reduction step involving direct contact with a hydrogen-containing gas. A hydrogen-containing recycle gas is also employed in the contacting step with the feed. Thus, part of the hydrogen-containing recycle gas may be employed as the pressuring gas simultaneously effecting reduction of the catalyst in zones 34 and 35.

The solids feeding device described above provides one means for taking granular solids at a low pressure and introducing them as a continuous stream into a subsequent contacting zone at a higher pressure. The granular solids accumulate in lower surge or induction zone 36 forming an accumulation 66 which submerges inlet opening 68 to the return bend portion 70 of upflow reaction zone 72.

The fluid to be treated in the reaction or conversion zone flows through line 72 into feed pump 74 at a rate controlled by flow recorder controller 76 and subsequently through line 78 together with recycle fluids introduced through line 80 and are passed through feed heating coil 82 of heater 84. These fluids are heated under pressure at least equal to or preferably greater than the desired inlet pressure to the reaction zone. The heated fluids pass subsequently through line 86 and are combined, if required, with preheated gases flowing from heater 84 through line 88. The combined feed fluid is introduced through line 90 into induction zone 36 wherefrom it flows through return bend zone 70 and reaction zone 72 concurrently with a moving mass of compact unfluidized granular solid contacting material while the granular solids are maintained therein at a bulk density substantially equal to the static at-rest bulk density of the solids or the bulk density of the moving bed of granular solids flowing downwardly by gravity through regeneration vessel 10. The inlet pressure of said fluids into induction zone 36 is maintained at a sufficiently high value relative to the outlet from the reaction zone to establish a flow of fluids therethrough sufficient to generate and maintain therein a conveyance force ratio which exceeds the value of 1.0 and which preferably exceeds a minimum of about 1.1. The maximum solids to fluid weight ratio exists at the minimum conveyance force ratio.

The products of conversion and the spent granular solids are discharged at a relatively low pressure into separator vessel 92 in which is maintained a bed 94 of compact solids, the upper portion of which covers the outlet opening 96 of the return bend outlet 98 of reaction zone 72. Under these circumstances a thrust force is applied to the discharging solids by the presence of the upper conical surface of solids bed 94 which has its apex within the outlet opening 96. The granular solids moving through the conversion zone 72 are thus prevented from fluidizing and are maintained at their maximum bulk density in substantially compact form.

The granular solids pass downwardly through separator zone 92 through product disengaging zone 100, stripping and sealing zone 102, stripping and sealing gas engaging zone 104, and subsequently through line 12 for retreatment in regeneration and reheating zone 10. The product fluids pass from disengaging zone 100 through line 106 at a rate controlled by valve 108 which also serves to maintain a constant low pressure in separator zone 92 relative to the high pressure maintained in induction zone 36. A sealing and stripping gas is introduced through line 110 at a rate controlled by valve 112 into engaging zone 104. Part of this gas passes upwardly through stripping zone 102 and serves to strip any residual product fluids from the spent solids. The remaining portion of this gas passes downwardly concurrent with the stripped solids through line 12 into regeneration vessel 10 and serves to prevent intermixing of product fluids with the regeneration fluids. Line 103 controlled by valve 105 is provided to remove solids for elutriation therefrom of solids fines or the continuous or intermittent withdrawal of solids which, due to extensive circulation, have accumulated quantities of undesirable materials which cannot be removed in the regeneration step. Such materials include noncombustible inorganic constituents which frequently accumulate in systems employing recirculating streams of granular coke, for example. Since the high solids to fluid ratios permissible in this process result in decreased degrees of solids contamination or deactivation in the case of catalysts, lines 103 and 29 may be employed to bypass part of the solids directly to the upper solids surge zone for repassage through the upflow contacting zone without reheating or regeneration.

The product fluids subsequently pass through line 114 into product fractionating means 116. This means is designated generally since any known method for fractionating and separating desirable fractions from product fluids may be employed. These means therefore include absorption, adsorption with granular solid adsorbents, fractional distillation, diffusional separation processes, fractional crystallization processes, and the like, depending upon the particular contacting process effected in reaction zone 72 and the nature of the product fluids.

Such a contacting process as described above is particularly well adapted to the conversion of hydrocarbon fractions in the presence of hot solids or hydrocarbon conversion catalysts. In these such processes the fractionation means will comprise solvent absorption, distillation, or selective adsorption or a combination thereof to separate the desirable gas products from the desirable liquid products and to produce a relatively unconverted fraction which may be circulated.

Therefore, the gas products are produced through line 118 and a portion thereof is disposed of to storage or other processing facilities not shown through line 120 controlled by back pressure regulator valve 122. In some processes such as catalytic desulfurization and catalytic reforming and some types of catalytic cracking, a recycle gas rich in hydrogen is passed through the conversion or reaction zone. Such a recycle gas when produced in fractionating means 116 flows therefrom through line 124 at a rate controlled by flow recorder controller 126 and passes through line 128 and recycle compressor 130 and preheating coil 132 for combination with the reacting fluids flowing into the reaction or conversion zone.

The desirable products are indicated generally as being produced separately from fractionation means 116 through lines 134, 136, and 138 respectively. It should be understood, however, that more or less than three such products can be produced when desired.

The relatively unconverted fraction of the contacting zone effluent is removed through line 140 from fractionation means 116 and is pumped by means of pump 142 at a rate controlled by valve 144 through line 80 and is then combined with the fresh feed fluid to the contacting system or disposed of by means not shown.

The apparatus shown and described in Figure 1 can be modified to include separator zone 92, regeneration zone 10 and solids feeding zone 30 may be disposed in a single vertical elongated column. Also the other types of contacting zone, separator zones, regenerator-reheating zones, and solids feeding zones shown in Figures 2–4 may be substituted for the ones shown.

Figure 2:
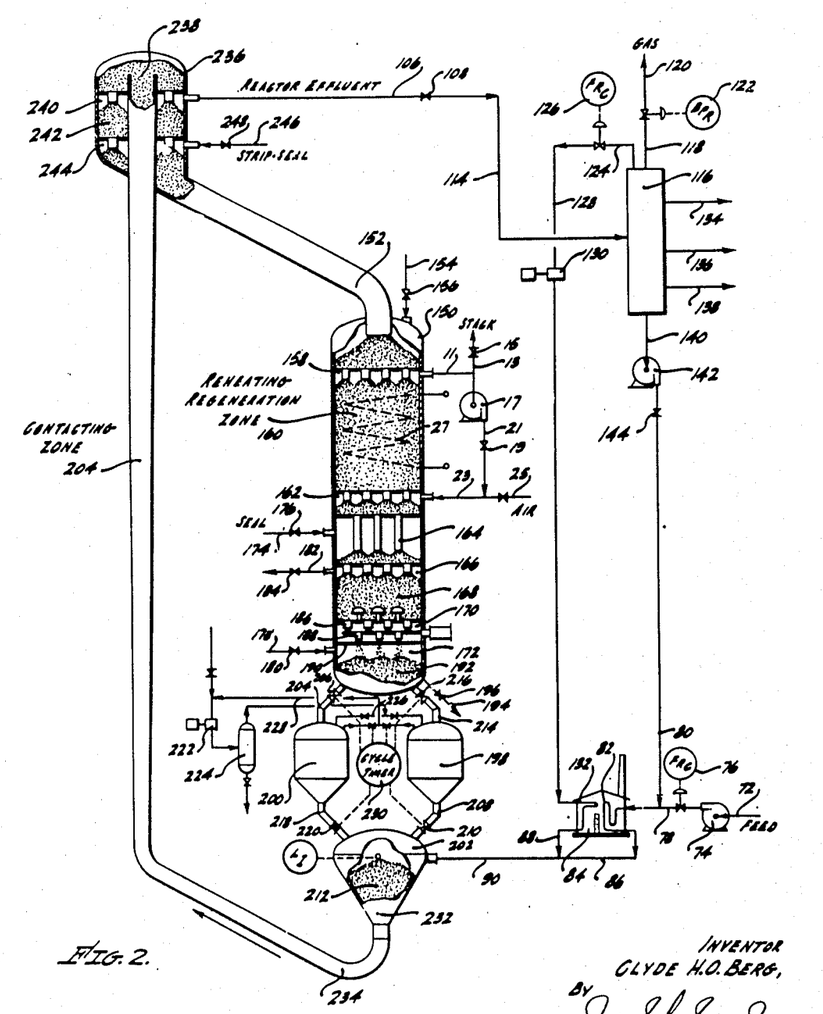
Figure 2 is similar to Figure 1 and shows a modified process.

Referring now more particularly to Figure 2, a flow sheet and partial elevation view in cross section of a modified contacting system according to this invention is shown. Those parts of the fractionating system and said reheating-regenerating system shown in this figure are the same as similarly designated elements shown in Figure 1 and will not be redescribed here.

A reheating and regeneration vessel 150 is supplied with spent granular solids following contact with fluids by means of line 152. Make-up solids may be added through line 154 controlled by valve 156. The granular solids pass downwardly as a moving bed successively through reheating or regeneration gas disengaging zone 158, reheating-regeneration zone 160, regeneration gas engaging zone 162, sealing zone 164, treating gas disengaging zone 166, treating zone 168, solids flow control zone 170, and surge zone 172. In zone 160, carbonaceous deposits from the circulating solids may be burned therefrom in the presence of a regeneration gas containing oxygen or the granular solids may be reheated by passing hot flue gases directly therethrough. The recirculation of regeneration and reheating gases is described above in connection with Figure 1.

Regenerated and/or reheated solids subsequently pass through dependent elongated tubes filled with solids which comprise sealing zone 164. A sealing and stripping gas such as steam is introduced around the tubes through line 174 controlled by valve 176. Part of this gas passes upwardly through the tubes of sealing zone 164 stripping regeneration gases from the solids and preventing such gases from entering treating zone 168. The remaining portion of the sealing and stripping gas passes downwardly into treating gas disengaging zone 166. The thus sealed and stripped solids subsequently pass into treating zone 168.

Treating zone 168 may comprise a solids stripping zone or a catalyst pretreatment zone in which the catalytic activity is adjusted to its desired level prior to contacting fluids in the contacting zone described below. In catalytic reforming and catalytic desulfurization of hydrocarbons and other conversion processes the catalyst is preferably reduced following regeneration. In such a case zone 168 comprises a catalyst reducing zone through which a stream of reducing gas passes successively through line 178 controlled by valve 180 up through solids feeder zone 170, through pretreatment zone 168 in contact with the solids and is removed therefrom through line 182 controlled by valve 184. This gas may also be introduced above the solids feeder zone by means not shown.

Below the lower part of pretreatment zone 168 is disposed solids feeder zone 170 which is adapted to maintain a predetermined solids circulation rate in the system and which effects a uniform downward velocity of solids throughout the entire cross sectional area of column 150. This solids feeding device is described in detail and claimed in U. S. Patent 2,544,214. Briefly, the device consists of an upper stationary tray 186, an intermediate reciprocating tray 188, and a lower perforated tray 190. The upper two trays are provided with dependent tubes alignable with each other. The lower tray is provided with apertures alignable with the tubes of movable tray 188 and adapted to be aligned therewith at a time when the tubes of upper tray 186 are out of alignment with tubes of reciprocating tray 188. Reciprocation of the intermediate tray at a given frequency establishes a fixed volumetric solids flow.

The regenerated and reheated granular solids form solids accumulation 192 in the bottom of column 150. From the solids accumulation granular solids may be withdrawn through line 194 intermittently or continuously controlled by valve 196 which serves to prevent accumulations in the circulating solids stream of undesirable constituents. At least two pressuring vessels, 198 and 200, are provided and are adapted to alternately receive solids from solids accumulation 192 and discharge them into induction zone 202 thus establishing a continuous removal of solids from the bottom of the column 150 and a continuous introduction of solids into contacting zone 204. Thus solids pass into pressuring zone 200 through line 204 controlled by valve 206 while zone 200 is maintained at a pressure equal to or lower than the pressure existing in the bottom of column 150. Simultaneously with this step, solids are draining from intermediate pressuring zone 198 through line 208 controlled by valve 210 to maintain the accumulation of compact unfluidized solids 212 in induction zone 202 which is maintained at a high pressure relative to the pressure of column 150. Subsequently intermediate pressuring zone 198 is depressured to the column 150 pressure and filled with solids through line 214 controlled by valve 216 while intermediate pressuring vessel 200 is pressuring and drained of solids through line 218 controlled by valve 220.

Pressuring gas is supplied by means of a compressor 222 which discharges into surge vessel 224 connected to high pressure manifold 226 which in turn communicates with each of the intermediate pressuring vessels through lines provided with automatic valves. These same pressuring vessels are connected through lines provided with additional automatic valves to low pressure manifold 228. Cycle timer 230 correlates the opening and closing of the automatic fluid valves and the operation of the solids flow control valves in the inlet and outlet conduits for solids to and from these vessels. Thus the solids flow from solids accumulation 198 at a relatively low pressure into one of the intermediate pressuring vessels, high pressure gas is introduced into the vessel full of solids, the pressured solids then flow into induction zone 202 to contact the reactant fluids in the process and the empty pressuring vessel then is depressured and is recycled with further granular solids. A plurality of such pressuring vessels results in a continuous movement and pressuring of the solids.

The feed to the process is introduced through line 72 as described in connection with Figure 1 and is ultimately heated and injected into induction zone 202 under an elevated pressure. The granular solids in solids accumulation 212 submerges the inlet opening 232 of contacting zone 204 whereby granular solids in compact unfluidized form flow concurrently with a depressuring flow of fluids to be contacted through return bend 234 into the main part of contacting zone 204 which rises and discharges contacted fluids and spent solids into separator zone 236.

The contacting zone is provided with a cross sectional area open to solids and fluid flow which increases in the direction of such flow. Thus as the pressure of the reacting fluids decreases the specific volume of the fluids increases, the continuously increasing area of contacting zone 204 may be designed to maintain the conveyance force ratio substantially constant throughout the length of the contacting zone. In any event, the pressure at which the solids are discharged into separator zone 236 is considerably less than the pressure existing in induction zone 202. The granular solids in contacting zone 204 are maintained in compact unfluidized form and at a bulk or apparent density substantially equal to the bulk density of the moving bed of solids in vessel 150. The prevention of fluidization is effected by discharging the solids from the outlet opening 238 of contacting zone 204 at a point adjacent and between about 0.1 and 2.0 zone 204 outlet opening diameters below the top of the separator zone 236. If desired, a separate transverse plate may be disposed at this outlet opening to supply the thrust force discussed above.

The compact unfluidized spent solids reverse flow direction adjacent the outlet opening 238 and pass downwardly through contacting effluent disengaging zone 240. From this zone by means of line 106 the contacting zone effluent is sent to fractionation facilities according to the method discussed in connection with Figure 1.

The spent solids subsequently pass through stripping and sealing zone 242. A stripping and sealing gas is introduced thereinto through stripping gas engaging zone 244 after introduction through line 246 controlled by valve 248. Part of this stripping gas passes countercurrent to the solids in stripping zone 242 and flows out of the system with the contacting zone effluent. The stripped solids then pass concurrently with the remaining portion of the stripping-sealing gas through transfer line 152, which also is effectively a sealing zone, into the top of column 150 for regeneration and reheating of the solids.

It will be apparent that the sealing and stripping zone shown in Figure 2 is different from that shown in Figure 1. The contacting zone 204 is also different as is the solids feeding and pressuring system. It should be understood that the different elements shown in Figure 2 are contemplated as being used also with the other elements shown in Figures 1, 3 and 4.

Figure 3:
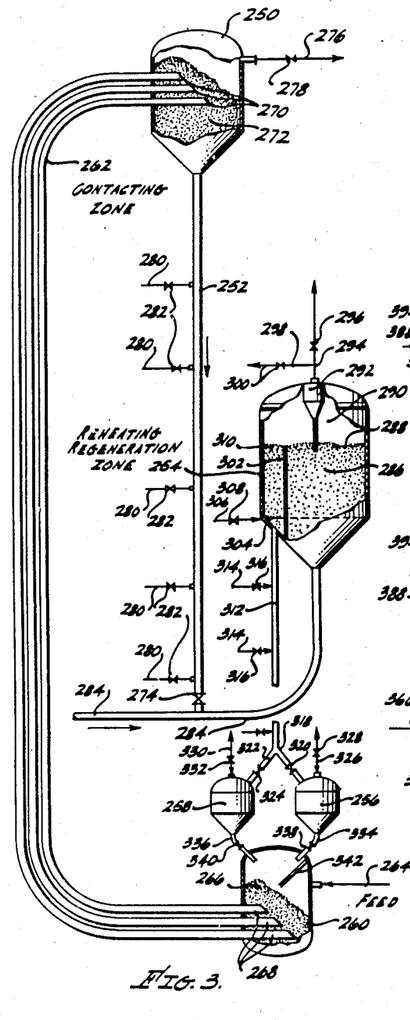
Figure 3 is an elevation view in partial cross section of an upflow contacting process in combination with a fluidized treating or contacting step.

Referring now to Figure 3, a modified upflow contacting system is shown as a combination elevation view and process flow diagram. This modification features the fluidized regeneration and/or reheating of the granular solid contact material in combination with the compact unfluidized upflow contacting step which is effected in a plurality of parallel conduits as the contacting zone.

The process is provided with contacting zone effluent-solids separator chamber 250, spent solids sealing and stripping zone 252, fluidized reheating-regeneration zone 254, regenerated or reheated solids pressuring vessels 256 and 258, induction zone 260, and upflow contacting zone 262 communicating the induction zone 260 with separator zone 250.

The fluid to be contacted with the granular solids is pumped and preheated if desired according to the procedures shown and described in the previous two figures. This fluid is then passed through line 264 under pressure into induction zone 260 in which is maintained a compact accumulation of unfluidized granular contact material 266. A plurality of parallel conduits comprising contacting zone 262 is employed. These conduits have inlet openings 268 submerged in solids accumulation 266. The feed fluid under pressure flows through substantially equal depths of solids in induction zone 260 whereby substantially equal quantities of solids are introduced into each individual conduit of the contacting zone. Continuous introduction of solids into induction zone 260 keep inlet openings 268 submerged in solids at all times.

The granular solids flow from induction zone 260 through the individual conduits of contacting zone 262 concurrently with a depressuring flow of the fluids to be contacted. Fluidization of the solids is prevented and granular solids are maintained throughout the contacting zone in compact form at a bulk density equal to the static at rest apparent bulk density of the solids. The thrust force required to so maintain the solids is applied by maintaining separation zone 250 sufficiently full of compact granular solids so as to submerge outlet openings 270 with a bed of such compact solids sufficient to prevent fluidization. The accumulation of solids 272 is maintained by variation of the amount of solids withdrawn therefrom utilizing control valve 274 situated at the lower end of sealing and stripping zone 252. The cross sectional area of zone 250 open to fluid flow through the solids therein is designed to keep the fluid velocity well below a value sufficient to counteract the gravitational forces. Thus a net gravitational force acts downwardly on the outlets 270 applying the thrust force referred to above.

The product, discharging with spent solids from the contacting zone 262 into separator zone 250, is removed through line 276 at a rate controlled by valve 278 and subsequently treated according to appropriate fractionation procedures. The spent granular solids flow from solids accumulation 272 downwardly by gravity through stripping zone 252 wherein they may be maintained either in compact unfluidized form or they may be at least partially fluidized by the introduction of a stripping and sealing gas at one or more points along the length of stripping zone 252 in quantities to effect fluidization. Such introduction of a stripping gas is indicated generally as lines 280 controlled by valves 282. During their downward passage they are countercurrently contacted by the sealing and stripping fluid which serves to strip residual product fluids from the solids and return them to separattor zone 250 for combination with the contacting zone effluent removed through line 276. The stripped spent solids are next subjected to reheating and regeneration.

The solids to be regenerated flow into and are suspended by a stream of regeneration gas passing through line 284 and the solids are carried thereby in suspension and are discharged into reheating and regeneration zone 254 wherein a fluidized turbulent mass of regenerated solids 286 is maintained. By controlling the upward fluid velocity through zone 254, a well defined interface 288 separating dense suspension 286 from a very dilute phase in region 290 may be maintained. Spent regeneration fluids pass from the dilute phase through suspended solids separator 292 wherefrom fines-free gases pass through line 294 and are discharged at a rate controlled by valve 296. Part of these regeneration gases may be recirculated through line 298 at a rate controlled by valve 300 and returned with fresh regeneration gas to regeneration zone 254 through line 284. The recovered fines are returned from separator 292 to the dense phase suspension 286.

One characteristic of the fluidized system of solids is that the inherent turbulence quickly dissipates heat generated at various points therein and maintains a substantially isothermal temperature condition throughout the entire system of suspended solids. Thus, such a system is admirably suited to the regeneration of catalysts such as those employed in hydrocarbon conversion reactions and in which the hydrocarbonaceous deactivating deposits are burned therefrom with a gas containing oxygen under temperature conditions limited by the catalyst deactivation temperature.

The regenerated solids accumulate to the left of partition 302 wherein they move downwardly countercurrent to a low velocity rising stream of stripping gas introduced into distributor 304 through line 306 at a rate controlled by valve 308. The gas velocity in stripping zone 310 is maintained at a value less than that required to maintain the fluidized dense suspension which exists in zone 286. A countercurrent regenerated solids stripping is thus obtained and the stripped regenerated solids pass therefrom through transfer line 312 for repressuring and introduction into the contacting zone. Further stripping may be effected by the introduction of stripping gas into transfer line 312 by means of lines 314 controlled by valve 316. This gas may be controlled to maintain the solids in a fluidized state or at a relatively low velocity to strip them as a moving bed.

The stripped regenerated solids are repressured for introduction into induction zone 260 in a system analogous to that employed in the process shown in Figure 2. The granular solids are alternately introduced at a relatively low pressure from the bottom of transfer line 312 through line 318 controlled by valve 320 into pressuring zone 256 and through line 322 controlled by valve 324 into pressuring zone 258. These pressuring chambers are alternately pressured or depressured by means of lines 326 controlled by valve 328 and line 330 controlled by valve 332, both of these lines being connected into low pressure and high pressure manifolds not shown but analogous to those shown in Figure 2. Granular solids, following the pressuring step, pass respectively from pressuring zones 256 and 258 through lines 334 and 336 controlled by valves 338 and 340 respectively into induction zone 260. If desired, suitable baffles, such as baffle 342, are provided in the induction zone to maintain substantially equal depths of solids above the inlet openings 268 of the individual conduits of the conveyance-contacting zone 262 to equalize solids introduction rates into each separate conduit. By the means thus shown, a continuous solids introduction is established and maintained.

Figure 4:
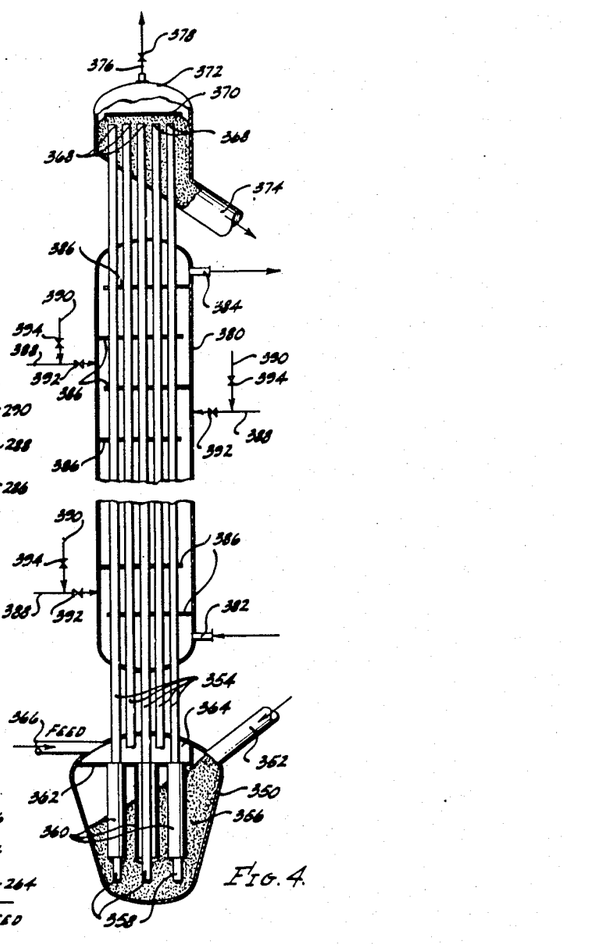
Figure 4 shows a modified detailed view of an upflow contacting apparatus adapted to temperature control of the contacting zone and in which a plurality of parallel conduits are employed.

It should be understood that the modified contacting zone, separator zone, regeneration zone and stripping zones shown in Figure 3 may be substituted for or employed with the respective zones indicated and described in Figures 1, 2 and 4. Thus a fluidized regeneration step may be substituted in the process of Figures 1 and 2 or used with the upflow contacting apparatus of Figure 4. The other combinations of individual elements should be obvious from the foregoing description of the three figures.

The contacting zone 262 of Figure 3, being provided with a plurality of parallel conduits, is adaptable to the provision of means for heating or cooling the contacting zone. Such means are indicated in Figure 4 together with modified types of induction and separator zones.

Referring now to Figure 4, induction zone 350 is provided with inlet conduit 352 for regenerated reheated solid contact material. A plurality of contacting zone conduits 354 extend downwardly into and are submerged at their inlet openings by a compact unfluidized solids accumulation 356. If desired, the inlet openings 358 may be restricted in area to facilitate solids entry thereinto. Coaxially surrounding the lower lengths of contacting zone conduits 354 are sleeves 360 forming annular introduction zones. These sleeves terminate at their upper ends at transverse baffle 362 forming thereabove a feed manifold 364. Inlet conduit 366 and the feed fluid to be contacted with the granular solids opens into the feed manifold 364.

The structure thus described is adapted to the uniform introduction of feed fluid into each of the individual contact-conveyance conduits 354 since the feed fluid flows through separate open low resistance paths consisting of introduction zones between sleeves 360 and the lower lengths of the individual conduits to separate points equidistant above inlet openings 358 of each conduit. Thus the major restriction of fluid flow into each contacting zone conduit exists in the solids bed immediately above the conveyance zone conduit inlets and below the lower end of each sleeve 360. An even fluid distribution thus results. The granular solid contact material flows into induction zone 350 around and between sleeves 360, solids not being able to enter and flow through the annular introduction zones between the conduits and the sleeves, which space remains open for fluid flow.

The feed fluid is introduced under pressure which is relatively high compared to the outlet of the conveyance-contacting zone 354. The fluid thus flows through the solids submerging inlet openings 358 and then upwardly through the contacting zone conduits concurrently with an upwardly moving compact unfluidized mass of granular contact material. Fluidization of the solids is prevented by a thrust force generated by the discharge of granular solids from the upper outlet openings 368 of contacting zone conduits 354 against transverse thrust plate 370 disposed adjacent the outlet openings. The spacing of such a thrust plate from the outlet openings may be between 0.1 and about 2.0 outlet opening diameters. The compact spent contact material and fluid products flow from separator zone 372 through transfer line 374 to a separator zone similar to those described in connection with the other figures. If desired, a product fluids may be removed directly from chamber 372 through line 376 at a rate controlled by valve 378.

The plurality of parallel conveyance-contacting zone conduits 354 is provided with an outer jacket or chamber 380. The construction is conveniently similar to that employed in a tube bundle heat exchanger. Inlet and outlet conduits 382 and 384 are provided for the introduction and removal of heat exchange fluids adapted either to impart heat to or remove heat from the moving compact solids and fluids flowing concurrently upwardly within the tubes. Many reactions effected in the presence of granular solids are endothermic and thus flue gases or other heating media may be circulated through the jacket 380 along the tortuous path formed therein by baffles 386. The temperature profile along the length of the contacting zone may be varied by providing additional fuel and air at various points throughout the length of jacket 380. Such means include line 388 for air and line 390 for fuel controlled respectively by valves 392 and 394. Other heating fluids can be thus introduced. By proper control of the relative amounts of heat thus introduced, any temperature profile may be established and maintained throughout the length of the contact-conveyance zone. High initial temperatures followed by decreasing temperatures may be maintained. An isothermal temperature profile can be established or a temperature profile which starts at a relatively low temperature and steadily rises throughout the length of the contacting zone may be employed.

It should be understood that the various other elements shown in Figures 1 through 3 may be combined with the particular conveyance-contacting system shown in Figure 4.

Figure 5:
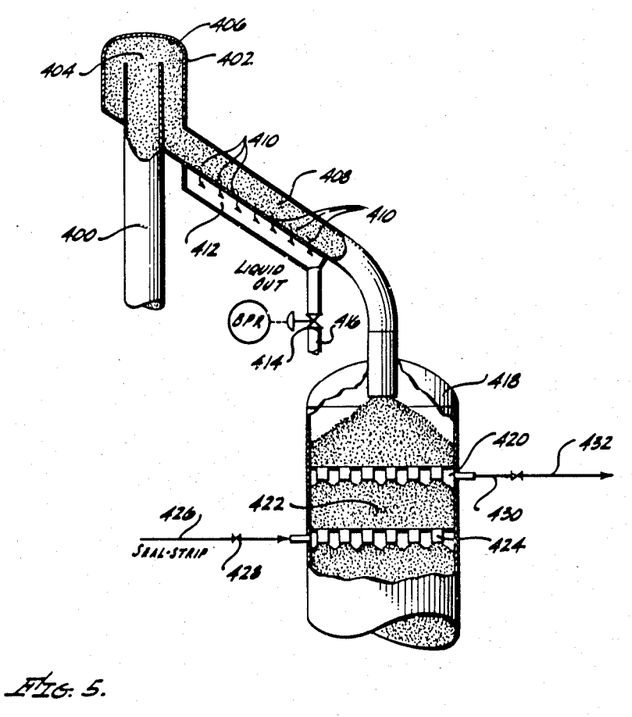
Figure 5 shows a modified apparatus for separating liquids from the solids following upflow contact.

Referring now to Figure 5, a modified separation chamber is shown adapted to effect separation of liquids following contact with compact unfluidized solids in the upflow contacting systems shown in Figures 1 through 4. The upper part of upflow contacting zone 400 is shown, which may comprise a plurality of parallel conduits as shown in Figures 3 and 4. The solids and liquid discharge into reversing chamber 402 which also provides the thrust force necessary to prevent fluidization and to maintain the solids in substantially compact form due to the proximity of outlet opening 404 to the upper inside surface 406. The solids and liquid pass downwardly by gravity through transfer-disengaging zone 408 provided on its lower surface with a plurality of apertures 410 which are preferably slots having a width of less than about 0.5 and preferably between about 0.1 and 0.25 times the average solids particle size. The solids continue down the transfer line while the major portion of the liquids and gases, if any, flow through apertures 410 into product receiving zone 412. This zone 412 is maintained at a pressure somewhat below that of reversing chamber 402 by the throttling action of valve 414 in product outlet line 416. The products thus removed are sent to fractionation facilities not shown but indicated in Figures 1 and 2 or to further processing or storage facilities not shown.

The solids, substantially free of liquid products, pass into the top of solids treating column 418 and then downwardly through stripping gas engaging zone 420, solids stripping zone 422 and stripping gas engaging zone 424. A sealing and stripping gas is introduced into zone 424 through line 426 controlled by valve 428 and flows upwardly through stripping zone 422 countercurrent to the spent solids thereby stripping residual liquids therefrom. Part of this gas passes upwardly through transfer-disengaging zone 408 for removal with the liquid products effecting additional stripping while the remaining part flows from zone 420 through line 430 controlled by valve 432 with residual liquid stripped from the solids and may be combined with the other liquid product stream. The liquid-free solids are then subjected to reheating, regeneration or other treatment as shown in Figures 1 through 3 and described above prior to repassage with additional liquid feed to be contacted.

Thus the upflow solids-fluid contacting process according to this invention is applicable to the treatment of gaseous or liquid fluids or mixtures thereof.

It should be understood that the upflow contacting zone may be disposed at an angle from the vertical if desired. This produces a longer contact time for substantially the same over-all contacting zone pressure differential, which is a function of the net elevation change. Also a highly increased residence time may be obtained by providing the upflow contacting zone with a conduit in the form of a helix with its axis vertical or at an angle less than 90° from the vertical.

In each of the foregoing five different modifications of upflow compact solids-fluid contacting system, the granular solids are conveyed generally upward by the direct contact thereof with a flow of one of the fluids to be contacted whereby a relatively high pressure gradient is established in the upflow contacting zone. A conveyance force ratio defined above is maintained at any value greater than 1.0 throughout the length of the contacting zone. Accordingly, a high pressure is maintained at the inlet of the contacting zone and this pressure decreases with distance from the contacting zone inlet into a low pressure region maintained at the outlet of the contacting zone, at which point the solids and product fluids are separated and the spent solids are stripped of residual product fluid. The solids are then passed generally downward through another contacting zone, either as a moving bed or a fluidized phase, to contact another fluid stream. This unique feature is common therefore to each modification of upflow compact solids contacting system described above and is responsible for the reduced volumetric loss of the fluids being contacted and the increased ease of stripping spent solids of fluid product. In addition, it permits the utilization of decreasing pressures throughout the length of a single continuous solids-fluid contacting zone which has heretofore been impossible. Accordingly, the advantages of high pressure solids-fluids contact may be realized without the disadvantages of difficult solids stripping and high pressure solids reheating and regeneration.

The upflow compact solids contacting process is applicable with the advantageous results discussed above to a wide variety of specific types of contacting processes. The following examples are intended to illustrate the specific applications of the process and the improved results obtainable therefrom but not to limit the application of this invention to such operations only.

EXAMPLE 1

Continuous catalytic cracking of a straight-run gas oil having a boiling range of 400° F. to 760° F. and an A. P. I. gravity of 31° is carried out in a conventional moving bed contacting process in which the gas oil vapor, at a temperature of between about 870° F. and about 925° F., contacts a granular cracking catalyst at a pressure of 25 p. s. i. g. The oil to catalyst ratio by volume is 0.4. The catalyst employed is acid-treated natural clay. The volumetric conversion to gasoline boiling below 400° F. is 31%. The spent catalyst is stripped with steam at a pressure of 25 p. s. i. g. immediately following the gas oil-catalyst contact.

The catalyst is circulated by means of a system of bucket elevators to a catalyst regeneration kiln. Following regeneration the catalyst is reconveyed by means of a separate bucket elevator and passed from a catalyst hopper at atmospheric pressure through a sealing leg 80 feet high into the gas oil cracking reactor maintained at 25 p. s. i. g. The total height of the structure required is 190 feet.

The catalyst loss due to attrition amounts to 4.2 tons per day when 135 tons per hour are circulated.

EXAMPLE 2

The catalytic cracking of the same gas oil of Example 1 is carried out under the same pressure and temperature conditions according to the process of the present invention in which the upflow contacting zone is employed as a catalyst cracking reactor. The same catalyst to oil ratio is used. The height of the reactor-conveyor is 75 feet. Gas oil vapor is introduced at a pressure of 50 p. s. i. g. and depressured concurrently with the cracking catalyst through the upflow cracking reactor and discharged at the top thereof at a pressure of 0.5 p. s. i. g. The product vapors are separated from the spent catalyst yielding a 39% by volume yield of gasoline boiling below 400° F. The spent catalyst is stripped at a pressure of between 0.5 and 1.0 p. s. i. g. countercurrently with steam immediately following the separation of spent catalyst and product vapors. The stripping steam requirement in the process according to this invention is reduced to about 35% of that required in the process of Example 1. The catalyst loss due to attrition is reduced to 0.2 ton per day.

EXAMPLE 3

In carrying out the process of Example 2 in the presence of synthetic bead silica-alumina cracking catalyst, under substantially the same reaction conditions, a volumetric yield of gasoline equal to 42% of the gas oil feed is obtained. The catalyst loss due to attrition is reduced to 0.17 ton per day.

In the foregoing three examples the catalyst was passed through the cracking and regeneration zones as a compact unfluidized moving bed.

EXAMPLE 4

The catalytic cracking of a straight-run gas oil having the same properties as the gas oil in Example 1 was effected by passage through the upflow cracking reactor of this invention depressuring from 75 p. s. i. g. to 5 p. s. i. g. in the presence of powdered cracking catalysts employed at a ratio of 3 tons of catalyst per ton of oil. The inlet temperature into the upflow cracking zone was 845° F. A 34% volumetric yield of 400° F. end point gasoline was obtained. The spent powdered catalyst, following stripping, was introduced into a fluidized regeneration zone through which a stream of flue gas containing air was passed at a velocity sufficient to maintain the regenerating powdered catalyst in the form of a dense phase suspension. The oxygen content of the regeneration gases was controlled to maintain the regeneration temperature below 1075° F. The hot regenerated and stripped catalyst powder was then passed through a plurality of pressuring chambers and reintroduced at 75 p. s. i. g. into the induction chamber for delivery with the gas oil vapor into the upflow cracking reactor.

In the catalytic cracking of hydrocarbons of the four examples above, temperatures between about 700° F. and about 1000° F. and pressures between atmospheric and about 150 p. s. i. g. may be employed.

EXAMPLE 5

Thermal contact coking is carried out in an upflow coking reactor employing granular coke particles having diameters of between about 0.25 and about 0.75 inch. These coke particles are passed through a heating zone wherein they are contacted with a gas containing oxygen thereby effecting a partial combustion of the coke and heating the residual particles to a temperature of about 1225° F. The granules may also be heated by directly firing the reheating zone with fuel gas and air. The heated particles are pressured through a plurality of intermediate pressuring zones into a coking vessel induction chamber at a pressure of 65 p. s. i. g. The coking feed stock is a residual oil having a boiling point above about 700° F. and having an A. P. I. gravity of 11°. This oil is preheated to about 400° F. and is pumped as a spray into the induction chamber wherein it contacts the hot coke particles and effects an immediate partial vaporization. The coke granules, coated with some liquid residual oil, are conveyed through a vertical coking zone by means of the depressuring flow of oil vapor formed in the induction zone. The vapor depressures to 7.5 p. s. i. g. at the outlet of the coking zone, the height being about 90 feet. The coker distillate yield is 86% by volume based on the residual oil feed. Low pressure steam stripping of coke granules at 7.5 p. s. i. g. contributes to the high liquid yield obtained.

In thermal coking, temperatures of from about 600° F. to about 950° F. in the coking zone may be employed by control of solids inlet and feed inlet temperatures. Pressures between atmospheric and about 150 p. s. i. g. may be used.

EXAMPLE 6

The catalytic reforming of petroleum hydrocarbon naphtha boiling below about 425° F. is efficiently carried out in the upflow contacting system according to this invention in which the reacting naphtha vapor and hydrogen-containing recycle gas conveys through the reaction zone a compact unfluidized mass of granular alumina carrier impregnated with molybdenum trioxide as the catalytic agent. Catalyst to oil ratio by weight is 1.5. The petroleum naphtha to be catalytically reformed is vaporized and preheated to a temperature of 975° F. and is introduced into the upflow reforming zone at a pressure of 225 p. s. i. g. This naphtha vapor is mixed with about 3000 standard cubic feet of hydrogen containing recycle gas per barrel of naphtha feed. The preheated mixture is depressured from 225 p. s. i. g. to 20 p. s. i. g. at the outlet of the upflow reforming zone. The upflowing catalyst is maintained in compact unfluidized form. The reformed vapors, including those stripped from the catalyst at 20 p. s. i. g., are cooled, condensed and fractionated and contain 36% aromatic hydrocarbons synthesized during the reforming step. The hydrogen-containing gas separated from the reactor effluent is recirculated with additional naphtha feed.

In the upflow reactor the temperature is maintained at an isothermal average of 910° F. by circulating flue gases through a jacket surrounding the upflow reforming zone.

The stripped catalyst is regenerated in the presence of flue gas and oxygen to remove the hydrocarbonaceous deactivating deposits while the regeneration temperature is limited to 1050° F. The regenerated catalyst is passed through a pressuring device in which intermediate pressuring vessels are employed as a catalyst reduction zone simultaneously. Hydrogen-containing recycle gas is employed to pressure up and simultaneously reduce the catalyst in the intermediate pressuring zones. The reduced regenerated catalyst is then passed into the induction zone from which it is conveyed through the reforming zone by means of the depressuring hydrogen-containing recycle gas and naphtha vapor feed.

In catalytic reforming, temperatures in the reforming zone are between about 700° F. and about 1100° F. and preferably between about 850° F. and 975° F. Preferable pressures are between about 50 p. s. i. g. and about 2000 p. s. i. g. depending upon the nature of the feed stock. Hydrogen recycle rates of between 500 and 10,000 s. c. f. per barrel of feed may be used, preferable values being between about 2000 and about 6000 s. c. f. per barrel.

EXAMPLE 7

The continuous desulfurization of 850° F. end point coker distillate produced from Santa Maria Valley (California) high sulfur crude petroleum is carried out to advantage in the process of the present invention. The coker distillate contains 1.97% by weight of sulfur and 0.2% by weight of nitrogen. A granular catalyst comprising a silica-alumina carrier upon which has been impregnated 2% to 3% by weight of cobalt oxide and from 8% to 12% molybdenum trioxide is employed, the granules being 2 to 6 mesh.

The gas oil feed is pressured to 1100 p. s. i. g. and preheated to 825° F. The preheated feed is mixed with 5000 standard cubic feet of hydrogen-containing recycle gas per barrel of feed, the recycle gas having been previously also heated to 825° F. The mixed preheated feed and recycle gas is injected into the upflow reactor induction zone at a rate of 1.0 volume of liquid feed per volume of catalyst and passed through the upflow reaction zone wherein the fluid depressures from 1100 p. s. i. g. to 600 p. s. i. g. The product separated from the catalyst discharging from the upflow desulfurization zone contains 0.09% by weight of sulfur and 0.007% by weight of nitrogen. The liquid yield obtained is 99% by volume. The spent stripped catalyst is subsequently regenerated by direct contact with flue gas containing oxygen, then reduced by direct contact with hydrogen-containing recycle gas, and then repressured into the induction zone at the inlet of the reaction zone.

This desulfurization operation, when carried out at 1600 p. s. i. g. and with lower hydrogen recycle rates, is in the liquid phase primarily and effective sulfur removal and catalyst life are obtained.

The desulfurization reaction is exothermic. The upflow reaction zone was cooled from the outside by controlled circulation of air through the jacket surrounding the upflow reaction zone thus maintaining substantially isothermal desulfurization conditions.

The desulfurization operation may be effected at temperatures between about 650° F. and about 900° F., at pressures between about 500 p. s. i. g. and about 2500 p. s. i. g. and with hydrogen recycle rates of between about 500 and about 10,000 s. c. f. per barrel.

EXAMPLE 8

The catalytic polymerization of butylene and propylene to form unsaturated hydrocarbons boiling in the gasoline range is advantageously effected in the upflow reaction process of this invention. The catalyst is solid phosphoric acid. The propylene- and butylene-containing gases, produced from the hydrocarbon cracking operations, are compressed to 500 p. s. i. g. and preheated to a temperature of between 350° F. and 400° F. The compressed gas is then introduced into the induction zone and depressured to about 50 p. s. i. g. in passing with the conveying catalyst through the upflow polymerization zone. The spent catalyst, separated from the reactor polymerization effluent is subsequently stripped at 50 p. s. i. g. and then regenerated with air introduced at 625° F. in a regeneration zone in which the temperature is limited to 950° F. The regenerated catalyst is subsequently hydrated with steam in a pretreatment solids pressuring zone at a temperature of 500° F. The product yield is 21 gallons of gasoline boiling range material per thousand standard cubic feet of propylene- and btuylene-containing cracking still gas.

This process may be effected at temperatures between about 250° F. and about 550° F., and at pressures between about 25 p. s. i. g. and about 1500 p. s. i. g.

EXAMPLE 9

The catalytic isomerization of normal butane in the presence of hydrogen chloride as catalyst promoter and in the presence of aluminum oxide impregnated with aluminum chloride as a catalyst is effectively carried out in the upflow reaction system of this invention. Normal butane is vaporized and preheated to a temperature of 275° F. and mixed with 8% by volume of gaseous hydrogen chloride. The mixture is formed at a pressure of 45 p. s. i. g. and is depressured through an upflow reaction zone 35 feet in height concurrently with an upwardly moving compact unfluidized bed of the aluminum chloride-oxide catalyst. The normal temperature rise of about 75° F. is dissipated by cool oil circulation around the conveying-isomerization zone. A conversion of 47% by volume of normal butane to isobutane results. The reactor effluent is fractionated to recover the isobutane and the normal butane remaining is recirculated for further reaction with fresh feed. The pressure existing at the outlet of the upflow isomerization zone is 6 p. s. i. g. The catalyst is stripped at this pressure with recycle hydrogen chloride to recover all the hydrocarbon product and the stripped catalyst is subsequently repressured to 45 p. s. i. g. and returned to the induction zone for repassage through the upflow isomerization zone. The hydrogen chloride is recovered from the hydrocarbon product by stripping and is recirculated with the normal butane feed. The heat liberated during the reaction is dissipated by recirculating a cooling fluid around the plurality of reaction-conveyance zones.

The catalytic isomerization process may be carried out at temperatures between about 175° F. to about 375° F. and at pressures between about 10 p. s. i. g. to about 200 p. s. i. g.

EXAMPLE 10

The conversion of hydrogen chloride, produced in a hydrocarbon chlorination process, to chlorine by reaction with granular $Fe_2O_3$ and subsequent regeneration with air of the $FeCl_3$ formed is very effectively performed at 98% efficiency using the principles of this invention. The process gas to be treated is available at a pressure of 150 p. s. i. g. and has the following composition:

Table I

| Component | Mol, percent | Rate, mols/hour |
|---|---|---|
| Hydrogen chloride | 12.0 | 8.7 |
| Methane | 76.0 | 55.1 |
| Ethane | 12.0 | 8.7 |
| | 100.0 | 72.5 | together with traces of chlorinated hydrocarbons. This gas is heated to about 450° F. and passed through an upflow reaction zone concurrently with 600 pounds per hour of granular ferric oxide maintained in compact and unfluidized form. The reaction zone is 25 feet in height and has a diameter of 4.0 inches. The pressure drops from 150 p. s. i. g. at the inlet to 85 p. s. i. g. at the outlet. The ferric oxide is about 85% $Fe_2O_3$. The reactor discharge gas has the following composition:

Table II

| Component | Mol, percent | Rate, mols/hour |
|---|---|---|
| Hydrogen chloride | 0.1 | 0.09 |
| Methane | 80.8 | 55.1 |
| Ethane | 12.8 | 8.7 |
| Water vapor | 6.3 | 4.32 |
| | 100.0 | 68.2 |

The quantity of solids is sufficient to permit about a 45% reaction of $Fe_2O_3$ to $FeCl_3$ in the reaction zone according to the equation:

$$Fe_2O_3 + 6HCl \rightarrow 2FeCl_3 + 3H_2O$$

The solids discharging from the reaction zone at a rate of 836.5 pounds per hour have the following composition:

Table III

| Component | Wt., percent | Rate, lbs./hour |
|---|---|---|
| $Fe_2O_3$ unreacted | 33.5 | 280.5 |
| Inert solids | 10.8 | 90 |
| $FeCl_3$ | 55.7 | 466 |
| | 100.0 | 836.5 |

These solids are stripped with natural gas to remove residual hydrogen chloride and then contacted as a moving bed in a downflow regeneration zone with 6125 s. c. f. per hour of air at calcination temperatures to regenerate the $FeCl_3$ to $Fe_2O_3$ and liberate chlorine according to the equation:

$$4FeCl_3 + 3O_2 \rightarrow 2Fe_2O_3 + 6Cl_2$$

This constitutes about a 50% excess air rate.

The regenerator discharge gas has the following composition:

Table IV

| Component | Mol, percent | Rate, s. c. f./hour |
|---|---|---|
| Chlorine | 23.45 | 1,625 |
| Nitrogen | 70.65 | 4,900 |
| Oxygen, unreacted | 5.9 | 409 |
| | 100.0 | 6,934 | and the solids in regenerated form are pressured back to 150 p. s. i. g. and introduced into the upflow reaction zone. A 98% conversion of the hydrogen chloride to chlorine is obtained, which is recovered from the regenerator discharge gas by compression and condensation.

Temperatures for the reaction step lie between about 350° F. and 600° F. and for regeneration of the solids temperatures between about 500° F. and 2000° F. may be employed. Metals such as magnesium, nickel, manganese, copper, and zinc also react similarly but iron is preferred. Reaction pressures are preferably high, between about 50 and 500 p. s. i. g., to minimize the iron chloride volatilization and enhance chloride formation, the regeneration pressure is preferably lower, such as below about 50 p. s. i. g., to enhance chlorine formation, conditions readily realized in this process as described.

The upflow contacting process of this invention is additionally characterized by its extremely high permissible solids-fluid weight ratios and the extremely low solids attrition rate. These characteristics permit the commercial utilization of high catalyst to oil ratios in hydrocarbon conversion operations and the numerous advantages resulting therefrom under economic operating conditions.

In hydrocarbon conversion reactions at high solids to oil ratios the amount of hydrocarbonaceous material present on the solids is very low thus permitting regeneration in some cases with air alone without danger of overheating, and also the continuous regeneration of only a portion of the solids flowing through the upflow contacting zone. The heat of combustion is largely absorbed by the solids with a relatively small temperature rise.

For example, in a vertical contacting zone 120 feet high and in which catalyst solids having sizes of about 4 to 8 mesh and an average temperature of 900° F., the maximum catalyst to hydrocarbon vapor weight ratio exceeds 100 tons per ton with gas oils or naphthas. The pressure differential is about 78 p. s. i. g. This maximum value is increased through use of catalyst having smaller sized particles and is reduced with larger solids. Smaller quantities of fluid are required to convey the smaller sized solid particles.

In a naphtha reforming operation in the same apparatus in which 3000 s. c. f. of hydrogen as recycle gas per barrel of naphtha feed are employed with 4 to 8 mesh catalyst, the maximum catalyst to reacting vapor ratio is about 74 tons per ton and the maximum catalyst to naphtha vapor ratio is about 80 tons per ton. With larger or smaller catalyst solids, these maximum ratios are lower or higher respectively. With impure hydrogen, the maximum ratios rise somewhat. With less recycle gas, the maximum ratio approaches about 100 tons per ton with 4 to 8 mesh solids and with more recycle gas the maximum ratio drops below the values given.

Solids to fluid ratios far below these maxima are obtained by increasing the fluid flow rate and/or decreasing the solids flow rate. Raising the fluid rate in a given upflow contacting zone increases the over-all pressure differential while increasing the solids rate does not affect it appreciably. Solids to fluid ratios as low as 0.1 ton per ton are obtainable. Accordingly, the very wide solids to oil ratio variation and the very high ratios obtainable are readily apparent.

In such processes the pressure differential existing between the inlet and outlet of the contacting zone is proportional to the length of the zone and also varies with the solids particle size.

Under all the above conditions, the solids loss due to attrition and abrasion has been reduced to very small fractions of those loss rates experienced with bucket elevator or gas-lift conveyance, in which latter method the solids are suspended or fluidized in a fluid and free to impact each other and the inside surfaces of the apparatus at velocities of 20 feet per second and higher. No such impact occurs in the upflow of compact unfluidized solids movement in the contacting zones of this invention solving a problem in the moving solids-fluid contacting which has long been encountered.

The foregoing examples are not intended to define the only processes to which the advantages and improved results of the upflow solids-fluids contacting process of this invention is applicable. Rather, they illustrate specific procedures and conditions employed in specific contacting processes to which the invention may be applied. The principles of the present invention as herein disclosed are therefore applicable to a wide variety of other specific contacting processes which will be apparent to those skilled in the various arts.

The upflow principles of the present invention may be applied with some of the advantages discussed above to these recirculatory solids contacting processes in which the solids fluid contacting step is effected with a downwardly moving bed of granular solids and in which the solids regeneration or reheating step is conducted in the upflow contacting process of this invention. Since generally the reaction occurring in regeneration or reheating is more exothermic than the reaction or contacting steps, the multiconduit upflow conveyance-contacting procedure of this invention is admirably well suited to dissipating such heat. But in any event, whether heat is added to or dissipated from the upflow contacting step, the extended external area of the upflow apparatus is highly advantageous. Thus, in any of the hydrocarbon conversion reactions in which hydrocarbonaceous deposits are laid down on the granular contact material, for example a spent cracking catalyst, a compressed regeneration gas consisting of flue gas with oxygen added in the form of air is employed as the conveyance-regeneration-reheating fluid. The hydrocarbonaceous deposit burns in the presence of the regeneration gas forming a hot regenerated stream of solids discharging from the upflow regeneration step at a low pressure relative to the pressure at which the spent solids were introduced. This low pressure permits the granular solid contact material to be readily stripped with a minimum of stripping gas forming a flue gas free regenerated catalyst.

In either of the foregoing systems, whether upflow contacting and downflow regeneration or downflow contacting and upflow regeneration are employed, many of the same advantages accrue including the complete elimination of the sealing legs and separate conveyance systems formerly required, the high permissible solids to fluid weight ratios, the wide variation in this ratio, and greatly reduced attrition rate.

In the present specification the term "substantially compact unfluidized form" is intended to indicate a mass of solids having an operating bulk density which is substantially the same as the vibrational static bulk density of the solids determined when at rest and in the absence of moving fluids. To determine whether or not the solids in a conveyance line or any portion thereof are moving in substantially compact form, resort may be had to any one of the following methods, which involve determination of bulk densities directly, or differential pressures, or changes in differential pressures with changes in flow rate of the conveying fluid. The first method to be discussed involves direct measurement of bulk densities.

The usual determination of the bulk density of granular solids is made in a vessel of known volume by applying vibrational forces to a known mass of solid granules. It is indicated that the moving solids in the apparatus of this invention are in the form of a continuous porous mass having an operating bulk density which is substantially the same as this vibrational bulk density.

The granular solids are conveyed in this state by means of a conveyance fluid depressuring through the substantially compact moving mass of granular solids so that substantially no fluidization or aeration or expansion of the porous mass of solids occurs to change the bulk density of the moving mass from this value.

It is recognized that the bulk density of a mass of granular solids is not always constant, but varies with the geometry of the particle arrangement. For example, a given mass of uniform spherical granules will have the least bulk density when systematically packed with particle centers coinciding with the corners of a cube (cubic packing-pore volume 47.64%[1]) and the greatest bulk density (about 41.5% greater) when uniformly packed with particle centers coinciding with the apexes of a tetrahedron (rhombohedral packing-pore volume 25.95%[1]). The bulk density of solids during conveyance according to this invention is intermediate between the bulk densities of solids uniformly packed according to the foregoing systems and is apparently a random mixture of several packing geometries. Similar density variations occur in packings of nonuniform and irregular particles.

In the conveyance system of the present invention such differences in packing arrangement apparently exist but they rarely if ever cause the bulk density of the moving solids to decrease more than 20% of the at-rest vibrational packed value and usually the decrease does not exceed about 5% of this value.

To illustrate the magnitude of the solids bulk density variation the following data are given typical of an operation for conveying compact solids:

| | |
|---|---|
| Conduit height, feet | 27.25 |
| Conduit attitude | Vertical |
| Conduit diameter, inches: | |
| Inlet | 3.068 |
| Outlet | 4.000 |
| Conveyance fluid | Air |
| Solids mesh size | 4–10 |
| Solids flow rate, lb./hr | 4,500 |
| Solids vibrational bulk density lb./cu.ft | 46.7 |

[1] Micromeritics, J. M. Dalla Valle (1943), p. 105.

Upon depressuring the conveyance fluid from the bottom of the conduit while preventing further introduction of solids thereinto, it was noted that the solids level dropped only 0.25 foot from the solids outlet at the top of the 27.25 foot line indicating an operating solids bulk density of 46.3 pounds per cubic foot during conveyance. This is approximately an 0.85% decrease from the static value and in most cases the decrease is less than 2%.

Thus the operational density of the flowing solids may be determined simply by depressuring the conveyance conduit from the inlet end so as to prevent continued introduction of solids from the induction chamber into the conduit proper and observing the change in position of the solids level at the conduit outlet as was done in obtaining the data above. The operating bulk density of the solids then may be calculated by multiplying the static vibrational bulk density determined as previously described, by the ratio of the volume of that portion of the conduit remaining full of solids to the total volume of the conduit.

If more convenient or as a check determination the operating bulk density may also be determined by depressuring the conduit as above, removing the granular solids from the entire conduit, weighing this material and dividing the weight by the volume of the conduit in question.

Another test for determining whether or not the flowing solids are in substantially compact form consists in observing the change in differential pressure over a selected length of the conveyance conduit effected by changing the rate of flow of the conveyance fluid. In fluidized or aerated solids suspensions and the conventional gas lift processes, increases in aeration or conveyance fluid flow decrease the density of the suspension being conveyed and correspondingly decreases this differential pressure while in the method of this invention increases in conveyance fluid flow rate through the compact solids increase the differential pressure markedly. This characteristic distinguishes the compact state of the granular solids flowing according to this invention from dense phase aerated suspensions of solids. For example in a 140 foot long conduit carrying 500 tons per hour of compact granular cracking catalyst by means of compressed air, the pressure differential is 49.6 pounds per square inch. A 10% increase in the volume of air injected into the inlet of the conduit raises the differential pressure to 60 pounds per square inch. By comparison, a 140 foot conduit conveying 82,200 pounds per hour of 12–30 mesh adsorbent carbon as a dilute suspension in air the pressure differential is 1.12 pounds per square inch and a 10% increase in the air input decreases the pressure differential to 0.99 pound per square inch. Similarly in aerated or so-called "fluidized" systems the pressure differential decreases with increase in gas velocity. Thus, it is seen that the magnitude of the pressure differential is on the order of 50 times greater in conveyance of compact solids than in dilute suspensions and in many cases is considerably greater. Furthermore, this pressure differential changes positively (increases) in the conveyance of substantially compact solids and negatively (decreases) in the conveyance of fluidized suspensions of solids with increases in conveyance fluid flow rate.

Still another test for "substantially compact form" involves measuring the pressure drop per unit length along the conduit and calculating the conveyance force ratio therein. This ratio is:

$$\frac{\left(\frac{dp}{dl}\right)}{\rho_s \cos \theta}$$

(the terms of which are given elsewhere herein). Except in relatively rare cases when the operating bulk density is decreased by an amount approaching 20% of the vibrational bulk density $\rho_s$ due to packing rearrangements of the compact solids and the ratio thus determined may be as low as 0.8, the conveyance force ratio as thus calculated exceeds 1.0 for conveyance of substantially compact solids whereas in a conduit carrying an aerated suspension a very considerably lower value of $$\left(\frac{dp}{dl}\right)$$

and a conveyance force ratio well below 1.0 based on the vibrational bulk density is found. Both compact and aerated solids may exist in the same conduit and is a desirable operation in such processes as contact coking wherein the solids increase the size during operation. The increased solids attrition due to the aeration reduces this particle size and may be controlled to balance one effect against the other. In most other cases it is desirable to maintain the entire mass of solids in compact form for minimum energy requirement and solids attrition rate.

Thus in the present invention, the granular solids are conveyed in substantially compact form by means of a concurrently depressuring conveyance fluid, if the operating bulk density is not more than 20% less than the static vibrational bulk density, or if there is an increase in pressure differential with increase in fluid flow rate, or if the conveyance force ratio is greater than 1.0.

Each solid particle is continuously in direct contact with several other particles surrounding it and are not free to move relative to them differentiating those conveyance operations in which the solids are aerated, fluidized or otherwise suspended in a fluid and have operating bulk densities always considerably less than 80% of the vibrational or static bulk density.

The solids to inner conduit wall angle of repose $\alpha°$ is defined as the maximum inclination (with respect to a horizontal plane) of a conduit full of granular solids at which the granular solids will not flow therethrough by gravitational forces alone. Gravity flow of solids can occur only when a conduit has an inclination greater than $\alpha°$. In all other flow directions a conveyance force is required to cause motion. Such other flow directions pass through the apex of and are included in the solid angle formed from rotating about a vertical axis the $(90+\alpha)°$ angle struck downward from that axis. The process and apparatus of the present invention is primarily applicable to the conveyance of granular solids in directions included in the solid angle defined above, but it is also applicable though part of the conveyance path is along a direction outside this solid angle.

This application is a continuation-in-part of application Serial No. 137,407, filed January 7, 1950, now abandoned.

I claim:

1. An improved process for the continuous contacting of a moving bed of compact granular solid contact material with a fluid stream which comprises submerging the lower inlet opening of a contacting zone with a downwardly moving accumulation of dense granular solid contact material, passing a stream of fluid to be contacted from said lower inlet opening at a relatively high pressure upwardly through said contacting zone concurrently with an upwardly moving compact bed of said solid material therein toward the upper outlet opening of said contacting zone, controlling the flow rate of said fluid at a value sufficient to counteract forces of gravity and friction acting on said solids to permit upward flow of said solids, applying a solids flow restricting thrust force against the dense mass of solids discharging at said upper outlet thereby preventing solids fluidization in said contacting zone and maintaining the solid contact material therein as an upwardly moving bed of dense solids having a bulk density substantially equal to the static bulk density of said solids when at rest, continuously removing discharged solids from adjacent said upper outlet of said contacting zone, controlling the rate of removal of solids from said outlet so as to control the rate of solids flow through said contacting zone, and maintaining in said contacting zone conditions of temperature and pressure adapted to effect a chemical reaction in the presence of said solids and said fluid moving upwardly therethrough whereby said solids are also discharged at an elevated point and are thus adapted to be returned by gravity flow from said upper outlet to said lower inlet.

2. A process according to claim 1 wherein said contacting zone comprises a plurality of parallel elongated contacting zones disposed adjacent one another in a bundle.

3. A process according to claim 2 in combination with an induction zone communicating with the lower inlet openings of said plurality of parallel conversion zones, and the steps of introducing said granular solid contact material into said induction zone at a rate sufficient to form and maintain therein said downwardly moving accumulation of dense granular solid contact material submerging said inlet openings, and introducing said fluid to be contacted into said induction zone whereby it passes downwardly through at least part of said accumulation, through said lower inlet openings, and then upwardly through said contacting zones.

4. A method according to claim 2 in combination with the steps of passing said fluid to be contacted first into a manifold zone, and then therefrom into and through a plurality of introduction zones surrounding the lower portions of each of said conversion zones, and then into and through substantially equal depths of said dense solids accumulation above the lower inlet openings of said parallel contacting zones whereby a uniform amount of said fluid to be contacted enters each of said contacting zones.

5. A process according to claim 1 in combination with the steps of passing at least part of said mass of discharged solid granular contact material by gravity from said elevated point adjacent said upper outlet opening of said contacting zone generally downwardly through a sealable solids pressuring zone and a second contacting zone, contacting said solids with another fluid stream therein, and returning at least part of the thus treated solids by gravity to said lower inlet opening of the first contacting zone for recirculation therethrough whereby no separate solids conveyance steps are required to maintain solids recirculation.

6. A process for the continuous conversion of hydrocarbons in the presence of a dense moving bed of solid granular hydrocarbon conversion catalyst which comprises supplying to a vertically disposed elongated hydrocarbon conversion zone at its lower inlet opening with a dense downwardly moving bed of granular solid hydrocarbon conversion catalyst to form and maintain an accumulation of said catalyst submerging said inlet opening, passing a hydrocarbon fluid to be converted successively through at least part of said accumulation under pressure into said inlet opening whereby said fluid flows through the interconnected interstices of a continuous compact fluid permeable mass of said catalyst in said conversion zone, maintaining a flow rate of said hydrocarbon fluid through said conversion zone at least sufficient to establish and maintain said substantial pressure gradient throughout said conversion zone which exceeds $dp/dl$ given by:

$$dp/dl = \rho_s \cos \theta$$

wherein $dp/dl$ is the pressure gradient in pounds per square foot of contacting zone length, $\rho_s$ is the static at-rest bulk density of the compact solids in pounds per cubic foot of occupied volume, and $\theta$ is the angle of inclination of the contacting zone struck downwardly from a vertical upward reference axis, thereby maintaining forces within said conversion zone necessary for upward catalyst mass movement, maintaining within said conversion zone hydrocarbon conversion temperatures of between about 175° F. and about 1100° F. and pressures between about atmospheric and about 2500 p. s. i. g. to form a converted hydrocarbon effluent and a spent catalyst discharging at the upper outlet opening of said conversion zone, applying a solids flow restricting force to the dense moving mass of spent catalyst discharging from the upper outlet opening of said conversion zone without substantially restricting flow of fluids therefrom thereby preventing catalyst fluidization and maintaining the catalyst entirely in compact form as a mass having substantially the solids' static bulk density therein, controlling the residence time of said catalyst in said contacting zone by controlling the rate of removal of said spent catalyst from said mass adjacent said upper solids outlet opening, independently of the control of the flow of said hydrocarbon therethrough, disengaging from said dense catalyst at said upper outlet a stream of converted hydrocarbon fluids as a conversion zone effluent, and removing said effluent as a product of the process at a pressure substantially below the elevated pressure maintained at said inlet opening.

7. A process according to claim 6 in combination with a heat exchange zone surrounding a substantial part of said elongated hydrocarbon conversion zone, and the steps of passing a heat exchange medium through said heat exchange zone in indirect heat exchange relation with said hydrocarbon conversion zone, and controlling the flow of said heat exchange medium to maintain said hydrocarbon conversion temperatures therein.

8. A process for the continuous catalytic cracking of hydrocarbons in the presence of a moving bed of solid granular hydrocarbon cracking catalyst which comprises establishing a vertically disposed elongated hydrocarbon cracking zone communicating at its lower inlet opening with an induction zone and at its upper outlet opening with an effluent disengaging zone disposed at a relatively high point, introducing into said induction zone a stream of said cracking catalyst to form and maintain therein a downwardly moving dense accumulation of said catalyst which submerges said lower inlet opening of said cracking zone, introducing the hydrocarbon to be cracked into said induction zone whereby it flows downwardly through at least part of said accumulation and into said inlet opening and upwardly through said cracking zone concurrently with a continuous compact fluid-permeable moving mass of said catalyst through said cracking zone and into said effluent disengaging zone, maintaining the catalyst and the hydrocarbon within said cracking zone at temperatures between about 700° F. and about 1000° F. and at pressures between about atmospheric and about 150 p. s. i. g. to effect a substantial degree of cracking of said hydrocarbon forming a cracked hydrocarbon effluent and a spent cracking catalyst therein and simultaneously delivering said spent catalyst to said relatively high point, applying a catalyst solids flow restricting force against the dense mass of spent catalyst discharging from said upper outlet opening of said cracking zone without substantially restricting the flow of said hydrocarbon effluent to maintain said catalyst at all points within said cracking zone as a dense moving mass having a bulk density substantially equal to the catalyst solids' static bulk density, maintaining a rate of said hydrocarbon flow through said cracking zone at least sufficient to establish and maintain a pressure gradient throughout said zone which exceeds $dp/dl$ given by:

$$\frac{dp}{dl} = \rho_s \cos \theta$$

wherein $dp/dl$ is the pressure gradient in pounds per square foot per foot of cracking zone length, $\rho_s$ is the static at-rest bulk density of the compact solids in pounds per cubic foot of occupied volume, and $\theta$ is the angle of inclination of the cracking zone struck downwardly from a vertical upward reference axis, disengaging the cracked hydrocarbon effluent from the dense moving mass of spent catalyst within said effluent disengaging zone, removing said effluent from said disengaging zone, removing the spent catalyst from said disengaging zone, and controlling the residence time of said catalyst in said cracking zone by regulating the rate of removal of spent catalyst solids from the mass of dense spent catalyst adjacent said upper outlet opening independently of the control of the flow of said hydrocarbon in said cracking zone.

9. A process for the continuous thermal coking of heavy hydrocarbons in the presence of a moving bed of solid granular contact material which comprises establishing a vertically disposed elongated hydrocarbon coking zone communicating at its lower inlet opening with an induction zone and at its upper outlet opening with an effluent disengaging zone disposed at a relatively high point, introducing into said induction zone a stream of said contact material to form and maintain therein a downwardly moving dense accumulation of said solids which submerges said lower inlet opening of said coking zone, introducing the hydrocarbon to be coked into said induction zone whereby it flows downwardly through at least part of said accumulation and into said inlet opening and upwardly through said coking zone concurrently with a continuous compact fluid-permeable moving mass of said contact material through said coking zone and into said effluent disengaging zone, maintaining the solids and the hydrocarbon within said coking zone at temperatures between about 600° F. and about 950° F. and at pressures between about atmospheric and about 150 p. s. i. g. to effect a substantial degree of thermal coking of said hydrocarbon forming a coked hydrocarbon effluent and a coke laden solid contact material therein and simultaneously delivering said coke laden solids to said relatively high point, applying a catalyst solids flow restricting force against the dense mass of coked solids discharging from said upper outlet opening of said coking zone without substantially restricting the flow of said hydrocarbon effluent to maintain said solids at all points within said coking zone as a dense moving mass having a bulk density substantially equal to the solids' static bulk density, maintaining a rate of said hydrocarbon flow through said coking zone at least sufficient to establish and maintain a pressure gradient throughout said zone which exceeds $dp/dl$ given by:

$$\frac{dp}{dl} = \rho_s \cos \theta$$

wherein $dp/dl$ is the pressure gradient in pounds per square foot per foot of coking zone length, $\rho_s$ is the static at-rest bulk density of the compact solids in pounds per cubic foot of occupied volume, and $\theta$ is the angle of inclination of the coking zone struck downwardly from a vertical upward reference axis, disengaging the coked hydrocarbon effluent from the dense moving mass of coked solids within said effluent disengaging zone, removing said effluent from said disengaging zone, removing said coked solids from said disengaging zone, and controlling the residence time of said solids in said coking zone by regulating the rate of removal of said coked solids from the mass of coked solids adjacent said upper outlet opening independently of the control of the flow of said hydrocarbon in said coking zone.

10. A process for the continuous catalytic reforming of hydrocarbons in the presence of a moving bed of solid granular hydrocarbon reforming catalyst which comprises establishing a vertically disposed elongated hydrocarbon reforming zone communicating at its lower inlet opening with an induction zone and at its upper outlet opening with an effluent disengaging zone disposed at a relatively high point, introducing into said induction zone a stream of said reforming catalyst to form and maintain therein a downwardly moving dense accumulation of said catalyst which submerges said lower inlet opening of said reforming zone, introducing the hydrocarbon into said induction zone whereby it flows downwardly through at least part of said accumulation and into said inlet opening and upwardly through said reforming zone concurrently with a continuous compact fluid-permeable moving mass of said catalyst through said reforming zone and into said effluent disengaging zone, maintaining the catalyst and the hydrocarbon within said reforming zone at temperatures between about 700° F. and about 1100° F. and at pressures between about 50 p. s. i. g. and about 2000 p. s. i. g. to effect a substantial degree of reforming of said hydrocarbon forming a reformed hydrocarbon effluent and a spent reforming catalyst therein and simultaneously delivering said spent catalyst to said relatively high point, applying a catalyst solids flow restricting force against the dense mass of catalyst discharging from said upper outlet opening of said reforming zone without substantially restricting the flow of said hydrocarbon effluent to maintain said catalyst at all points within said reforming zone as a dense moving mass having a bulk density substantially equal to the catalyst solids' static bulk density, maintaining a rate of said hydrocarbon flow through said reforming zone at least sufficient to establish and maintain a pressure gradient throughout said zone which exceeds $dp/dl$ given by:

$$\frac{dp}{dl} = \rho_s \cos \theta$$

wherein $dp/dl$ is the pressure gradient in pounds per square foot per foot of cracking zone length, $\rho_s$ is the static at-rest bulk density of the compact solids in pounds per cubic foot of occupied volume, and $\theta$ is the angle of inclination of the cracking zone struck downwardly from a vertical upward reference axis, disengaging the reformed hydrocarbon effluent from the dense moving mass of spent catalyst within said effluent disengaging zone, removing said effluent from said disengaging zone, removing the spent catalyst from said disengaging zone, and controlling the residence time of said catalyst in said reforming zone by regulating the rate of removal of said spent catalyst from the mass of spent catalyst adjacent said upper outlet opening independently of the control of the flow of said hydrocarbon through said reforming zone.

11. A process for the continuous catalytic desulfurization of hydrocarbons in the presence of a moving bed of solid granular hydrocarbon desulfurization catalyst which comprises establishing a vertically disposed elongated hydrocarbon desulfurization zone communicating at its lower inlet opening with an induction zone and at its upper outlet opening with an effluent disengaging zone disposed at a relatively high point, introducing into said induction zone a stream of said desulfurization catalyst to form and maintain therein a downwardly movnig dense accumulation of said catalyst which submerges said lower inlet opening of said desulfurization zone, introducing the hydrocarbon to be desulfurized into said induction zone whereby it flows downwardly through at least part of said accumulation and into said inlet opening and upwardly through said desulfurization zone concurrently with a continuous compact fluid-permeable moving mass of said catalyst through said desulfurization zone and into said effluent disengaging zone, maintaining the catalyst and the hydrocarbon within said desulfurization zone at temperatures between about 650° F. and about 900° F. and at pressures between about 500 p. s. i. g. and about 2500 p. s. i. g. to effect a substantial degree of hydrocarbon desulfurization forming a desulfurized hydrocarbon effluent and a spent catalyst therein and simultaneously delivering said spent catalyst to said relatively high point, applying a catalyst solids flow restricting force against the dense mass of spent catalyst discharging from said upper outlet opening of said desulfurization zone without substantially restricting the flow of said hydrocarbon effluent to maintain said catalyst at all points within said desulfurization zone as a dense moving mass having a bulk density substanitally equal to the catalyst solids' static bulk density, maintaining a rate of said hydrocarbon flow through said desulfurization zone to establish and maintain a pressure gradient throughout said zone at least sufficient to exceed $dp/dl$ given by:

$$\frac{dp}{dl} = \rho_s \cos \theta$$

wherein $dp/dl$ is the pressure gradient in pounds per square foot per foot of desulfurization zone length, $\rho_s$ is the static at-rest bulk density of the compact solids in pounds per cubic foot of occupied volume, and $\theta$ is the angle of inclination of the desulfurization zone struck downwardly from a vertical upward reference axis, disengaging the desulfurized hydrocarbon effluent from the dense moving mass of spent catalyst within said effluent disengaging zone, removing said effluent from said disengaging zone, removing the spent catalyst from said disengaging zone, and controlling the residence time of said catalyst in said desulfurization zone by regulating the rate of removal of spent catalyst solids from the dense mass of spent catalyst adjacent said upper outlet opening independently of the control of the flow of said hydrocarbon through said desulfurization zone.

12. A process for the continuous regeneration of spent hydrocarbon conversion catalyst contaminated with a hydrocarbonaceous deposit which comprises establishing a vertically disposed elongated catalyst regeneration zone communicating at its lower inlet opening with an induction zone and at its upper outlet opening with a spent regeneration gas disengaging zone disposed at a relatively high point, introducing into said induction zone a stream of said spent hydrocarbonaceous catalyst to form and maintain therein a downwardly moving dense accumulation of said spent catalyst which submerges said lower inlet opening of said regeneration zone, introducing into said induction zone a regeneration gas under pressure whereby it flows downwardly through at least part of said accumulation and into said inlet opening and upwardly through said regeneration zone concurrently with a continuous compact fluid-permeable moving mass of said catalyst into said disengaging zone, maintaining an oxygen concentration in said regeneration gas flowing through said regeneration zone, maintaining said regeneration gas and said spent catalyst within said regeneration zone at temperatures sufficient to effect a substantial degree of burning of said hydrocarbonaceous deposit by said oxygen from said catalyst to effect a substantial degree of catalyst regeneration forming a spent regeneration gas and an at least partially regenerated hydrocarbon conversion catalyst and simultaneously delivering said catalyst to relatively high point, applying a catalyst solids flow restricting force against the dense mass of regenerated catalyst discharging from said upper outlet opening of said regeneration zone without substantially restricting the flow of said regeneration gas to maintain said catalyst at all points within said regeneration zone as a dense moving mass having a bulk density substantially equal to the catalyst solids' static bulk density, maintaining a rate of said regeneration gas flow through said regeneration zone at least sufficient to establish and maintain a pressure gradient throughout said zone which exceeds $dp/dl$ given by:

$$\frac{dp}{dl} = \rho_s \cos \theta$$

wherein $dp/dl$ is the pressure gradient in pounds per square foot per foot of regeneration zone length, $\rho_s$ is the static at-rest bulk density of the catalyst solids in pounds per cubic foot of occupied volume, and $\theta$ is the angle of inclination of the regeneration zone struck downwardly from a vertical upward reference axis, disengaging the said spent regeneration gas from the dense moving mass of said regenerated catalyst within said disengaging zone, removing said spent regeneration gas therefrom, removing the regenerated catalyst therefrom, and controlling the residence time of said catalyst in said regeneration zone by regulating the rate of removal of said regenerated catalyst solids from the dense mass of regenerated catalyst solids adjacent said upper outlet opening independently of the control of the flow of said regeneration gas through said regeneration zone.

13. A process according to claim 12 wherein said regeneration gas introduced into said induction zone comprises a spent regeneration gas substantially free of oxygen, in combination with the step of introducing an oxygen-containing gas into said regeneration zone at at least one point along the length thereof so as to maintain said oxygen concentration therein.

14. A process according to claim 5 wherein said solids are passed by gravity downwardly from said mass of discharged solids at said elevated point into and through said second contacting zone as a downwardly moving dense bed of solids.

15. A process according to claim 5 wherein said solids passed generally downwardly by gravity from said elevated point through said second contacting zone are fluidized therein by the step of controlling the rate of flow of a second fluid passing upwardly therethrough to form and maintain therein a fluidized turbulent suspension of said solids having an apparent bulk density substantially less than the bulk density of the dense mass of solids flowing upwardly through said first contacting zone.

16. A process according to claim 5 wherein said second contacting zone comprises a hydrocarbon conversion zone, the conditions of temperature and pressure therein are hydrocarbon conversion conditions, said first contacting zone comprises a solid contacting material regeneration and reheating zone, and the fluid passed therethrough in contact with said solids contains oxygen.

17. A process according to claim 5 wherein said first contacting zone comprises a hydrocarbon conversion zone, the conditions of temperature and pressure therein are hydrocarbon conversion conditions, said second contacting zone comprises a solid contact material regeneration and reheating zone, and the fluid passed therethrough in contact with said solids contains oxygen.

18. A process according to claim 5 wherein said sealable pressuring zone comprises a plurality of separate sealable pressuring zones, in combination with the steps of introducing said solids from said second contacting zone into one of said pressuring zones at a relatively low pressure, mechanically sealing said zone from said contacting zones, raising the pressure of fluids present in said pressuring zone to a relatively high pressure which is substantially the same pressure as that at which the fluid is introduced at said lower inlet opening of said first contacting zone, flowing the thus pressured solids to said relatively low point for addition to the dense solids accumulation submerging said lower inlet opening, then depressuring said pressuring zone to said relatively low pressure prior to the introduction of additional solids thereto, and sequentially pressuring and emptying and depressuring and filling each of said plurality of pressuring zones to establish and maintain a substantially continuous removal of solids from said second contacting zone at said relatively low pressure and a substantially continuous supply of solids at said relatively high pressure to said accumulation at said lower inlet opening of said first contacting zone.

19. A process according to claim 18 wherein said solids comprise a granular solid hydrocarbon conversion catalyst, in combination with the step of introducing a gas containing hydrogen into said pressuring zones while pressuring the catalyst solids therein so as to effect a reduction by hydrogen of said catalyst during the solids pressuring step.

20. A process according to claim 5 in combination with a solids stripping zone in gravity flow receiving relation to said upper outlet opening of said first contacting zone and in gravity flow solids delivery relation to said second contacting zone, and the steps of passing a stripping gas through said stripping zone substantially at the same relatively low pressure as that maintained at said upper outlet opening whereby said spent solids are stripped of residual fluids obtained in said first contacting zone and at a pressure substantially below that at which said fluids were introduced into said first contacting zone and in the absence of sealing leg zones.

References Cited in the file of this patent

UNITED STATES PATENTS

| | | |
|---|---|---|
| 2,416,729 | Arveson | Mar. 4, 1947 |
| 2,427,341 | Alther | Sept. 16, 1947 |
| 2,429,359 | Kassel | Oct. 21, 1947 |
| 2,459,824 | Leffer | Jan. 25, 1949 |
| 2,587,670 | Weinrich | Mar. 4, 1952 |
| 2,625,442 | Kollgaard | Jan. 13, 1953 |
| 2,628,188 | Kirkbride et al. | Feb. 10, 1953 |
| 2,684,124 | Hines | July 20, 1954 |
| 2,700,015 | Joyce | Jan. 18, 1955 |